US006776744B1

(12) United States Patent
Shieh

(10) Patent No.: US 6,776,744 B1
(45) Date of Patent: Aug. 17, 2004

(54) METHOD FOR AND DEVICES USED IN COVERING A ROLL CORE WITH A RESIN INFUSED FIBER REINFORCED ADHESIVE UNDER LAYER AND A POLYMERIC TOP LAYER, THE METHOD INCLUDING THE USE OF AN IMPROVED MOLD TAPE

(75) Inventor: Yang T. Shieh, Wallingford, PA (US)

(73) Assignee: Advanced Materials Corporation, Lester, PA (US)

( * ) Notice: Subject to any disclaimer, the term of this patent is extended or adjusted under 35 U.S.C. 154(b) by 0 days.

(21) Appl. No.: 09/363,328

(22) Filed: Jul. 28, 1999

(51) Int. Cl.[7] .............................................. B23P 15/00
(52) U.S. Cl. ......................................... 492/56; 492/48
(58) Field of Search ............................... 492/7, 20, 56; 428/34.5, 34.6, 35.9, 36.9; 162/205

(56) References Cited

U.S. PATENT DOCUMENTS

| 3,437,032 A | 4/1969 | Manghirmalani et al. ...... 100/93 |
| 3,599,306 A | 8/1971 | Brafford ....................... 29/132 |
| 3,616,670 A | 11/1971 | Lemelson |
| 3,622,412 A | 11/1971 | Ross ............................ 156/87 |
| 3,707,752 A | 1/1973 | Bradfford et al. ............. 29/132 |
| 3,730,794 A | 5/1973 | Ross ............................ 156/112 |
| 3,800,381 A | 4/1974 | Bradfford ..................... 29/132 |
| 4,242,783 A | 1/1981 | Watanabe et al. ............. 29/132 |
| 4,258,089 A | 3/1981 | Anderson et al. ............. 29/132 |
| 4,288,058 A | 9/1981 | Inman ......................... 249/134 |
| 4,309,803 A | 1/1982 | Blaszak ....................... 29/130 |
| 4,368,568 A | 1/1983 | Watanabe ..................... 29/130 |
| 4,466,164 A | 8/1984 | Tadokoro et al. ............. 29/132 |
| 4,576,845 A | 3/1986 | Krotchko ..................... 428/36 |
| 4,705,711 A | 11/1987 | Perna .......................... 428/141 |
| 4,707,408 A | 11/1987 | Iwasawa et al. ............. 429/379 |
| 4,760,232 A | 7/1988 | Smith .......................... 219/61 |
| 4,920,623 A | 5/1990 | Neuhoffer et al. ............ 29/129 |
| 5,014,406 A | 5/1991 | Kato et al. .................... 29/130 |
| 5,091,027 A | 2/1992 | Watanabe .................... 156/172 |
| 5,257,966 A | 11/1993 | Watanabe et al. ............. 492/37 |
| 5,319,430 A | 6/1994 | DeBolt et al. ............... 355/290 |

(List continued on next page.)

FOREIGN PATENT DOCUMENTS

| EP | 1 041 197 A1 | 10/2000 |
| WO | WO 98/54405 A1 | 12/1998 |

Primary Examiner—Richard Weisberger
(74) Attorney, Agent, or Firm—Caesar, Rivise, Bernstein, Cohen & Pokotilow, Ltd.

(57) ABSTRACT

The invention includes a method for producing a covered roll having a reinforcement fiber mat under layer infused with low viscosity thermoset resin and a smooth high temperature, high performance polymeric outer layer. The mat is formed of a plurality of layers, each layer having a leading edge that abuts a following edge when wrapped over the roll core, each subsequent layer being affixed to the previous layer along a seam, the seams being spaced apart angularly from one another to prevent irregularities over the surface of the resulting roll core. One or more layers of the dry reinforcement fiber mat may be formed of a two-ply construction, the first ply having fibers arranged in a random pattern, the second ply having aligned fibers oriented either parallel or perpendicular to the roll core central axis. The invention also includes an improved mold tape assembly for use in applying a polymeric cover over a roll core and an inventive apparatus for fabricating the mold tape assembly. The mold tape assembly is formed of at least two ribbons that are arranged in a substantially parallel and partially overlapping orientation, the ribbons being spot welded together at a predetermined radius of curvature. The apparatus for fabricating the mold tape assembly further includes an inventive device for aligning the ribbons prior to welding and an inventive curvature shoe for disposing the ribbons at a predetermined radius of curvature during welding.

17 Claims, 21 Drawing Sheets

U.S. PATENT DOCUMENTS

| | | |
|---|---|---|
| 5,324,248 A | 6/1994 | Quigley ........................ 492/50 |
| 5,334,124 A | 8/1994 | Ohno .......................... 492/50 |
| 5,376,448 A | 12/1994 | Suzuki et al. ................ 428/382 |
| 5,387,172 A | 2/1995 | Habenicht et al. ............. 492/50 |
| 5,468,531 A | 11/1995 | Kikukawa et al. .......... 428/36.5 |
| 5,549,154 A | 8/1996 | Niskanen et al. .............. 165/89 |
| 5,571,066 A | 11/1996 | Kayser ........................ 492/46 |
| 5,597,652 A | 1/1997 | Utsunomiya et al. ........ 428/382 |
| 5,601,920 A * | 2/1997 | Paasonen et al. ........... 428/375 |
| 5,694,734 A | 12/1997 | Cercone et al. |
| 5,785,636 A * | 7/1998 | Bonander et al. |
| 6,044,963 A * | 4/2000 | Lerch et al. |
| 6,338,706 B1 | 1/2002 | Sohl |

* cited by examiner

METHOD FOR AND DEVICES USED IN COVERING A ROLL CORE WITH A RESIN INFUSED FIBER REINFORCED ADHESIVE UNDER LAYER AND A POLYMERIC TOP LAYER, THE METHOD INCLUDING THE USE OF AN IMPROVED MOLD TAPE

BACKGROUND OF THE INVENTION

The invention relates to a method and apparatus for covering a roll core that can be metallic or non-metallic with a resin infused fiber reinforcement mat under layer and a polymeric top layer, the top layer preferably formed of a high performance thermoplastic material. However, the present invention is not limited to the use of high performance thermoplastic materials and contemplates the use of other extrudable elastomers such as rubbers or processable urethanes and high viscosity thermoset resins such as polyurethanes and epoxies in general. The resin used for infusion is epoxy or other preferable resins such as cyanate ester, vinyl ester, phenolic, and other low viscosity thermoset systems. The reinforcement fiber mats are preferably made of glass fibers, carbon fibers, aramid fibers (e.g., Kevlar fibers), or other mineral/metallic high strength fibers. These covered rolls are utilized in many applications including an application known as calendering. Calendering is the act of pressing a material, e.g., cloth, rubber, plastics or paper, between rollers or plates in order to smooth or glaze or to thin into sheets. The covered rolls that are discussed in this application are also known as calender rolls, soft-nip calender rolls and supercalender rolls and are often utilized in industrial environments such as paper mills. However, the invention described herein is not limited to covered rolls known by these names or utilized in these environments.

In a typical paper mill, large numbers of rolls are used not only for transporting the web sheet which becomes paper, but also for calendering or processing the web sheet into a specific grade of paper. The finished paper product must possess certain quality characteristics such as a high degree of caliper uniformity, bulk uniformity, smoothness, gloss and printability. In order to achieve these quality characteristics, it is necessary that the calender roll is precisely manufactured utilizing materials that can withstand severe mechanical and chemical conditions during paper processing.

For example, when used for transporting the web sheet during paper processing, it is essential that these covered rolls provide traction to enable the transport of the paper. Additionally, these rolls must be wear and corrosion resistant. During use for calendering, these covered rolls are subjected to high dynamic stress, heat, speed, abrasion and impact and therefore must be fabricated to withstand these elements. In order to function properly for these specific uses, the covered rolls must have an appropriate surface hardness based upon the intended application for the covered roll and also have a high thermal resistance to withstand high temperatures and pressures in the environments in which they are employed. Regardless of their application, these covered rolls are precision elements of the systems in which they are utilized and therefore must be precisely manufactured to achieve balance, specific size and shape specifications, surface characteristics and tight tolerances. The covered rolls have similar transporting and calendering functions in the textile industry as well as in facilities where magnetic tape is manufactured.

Conventional prior art calender rolls comprise a metal cylinder to which either a cotton-filler or a thermoset composite layer (or layers) is added to preclude metal-to-web-to-metal contact at the nip between the calender rolls during the calendering operation. Though cotton-filled roll covers have been used for a long time there are several drawbacks associated with their use such as the need for frequent regrinding. Moreover, cotton filler material is not sufficiently tough to withstand the high stress, high impact requirements and high temperatures that are associated with demanding applications such as in modern paper fabrication. Paper mills must frequently regrind and replace cotton-filled roll covers, even when they perform well. This results in significant production down-time and high costs associated with keeping replacement rolls in inventory.

Over the last two or three decades, synthetic composite roll covers have been developed to resolve many of the problems associated with cotton-filled roll covers. Most of these synthetic composite roll covers use some form of thermoset resin such as epoxy, rubber or polyurethane among others, as a base material which is combined with some form of reinforcement material to improve strength.

As an example, a synthetic composite roll cover is formed of a single layer of reinforcement fiber mat that is impregnated with a thermoset epoxy which is then cured. The surface of the cured single layer is then machined to a smooth finish in accordance with customer specifications.

Alternatively, rather than machining the cured single layer to a smooth finish, a different additional layer of reinforcement fiber mat may be added over the cured single layer, the additional layer being impregnated with an epoxy which is then cured to form a top layer. The surface of the cured top layer, which provides the outer surface of the roll with better characteristics is then machined to a smooth finish in accordance with customer specifications. The single layer which forms an under layer, provides a transitional element between the metal core and the top layer to assist in establishing an effective bond and stress distribution between the two layers of the covered roll. Alternatively, additional layers could be added.

In practice, a layer of the synthetic composite cover is added to the roll core by unspooling a strip of dry reinforcement fiber mat, several inches in width, from a reel and conveying the unspooled strip through an epoxy bath. The roll core is oriented horizontally and rotated to wind the epoxy impregnated strip onto the roll core helically in a back and forth fashion over the roll core length several times until a desired thickness is reached. The epoxy is then allowed to cure to form a layer which is then machined to a smooth finish.

The use of these synthetic composite roll covers has increased dramatically in the last ten years because of their superior performance characteristics over conventional cotton-filled roll covers. The acceptance and usage of synthetic composite roll covers in the paper industry has resulted in the beginning of the demise of the cotton-filled roll cover. Notwithstanding their superiority over cotton-filled roll covers, synthetic composites such as thermosetting epoxies also suffer from several drawbacks. For example, to formulate a synthetic composite roll cover having certain desirable properties such as high toughness, high temperature capability, i.e., high glass transition temperature ($T_g$), it is usually necessary to employ a higher concentration of reinforcement fibers. Increasing the concentration of reinforcement fibers utilized in this manner can result in the emergence of other less desirable properties such as unacceptable surface finish, easier delamination, greater brittleness, and poor bonding between the cover and the metal outer surface of the roll core, etc. Roll manufacturers struggle to optimize these conflicting properties to achieve a superior roll cover. Failure and inconsistent performance of the synthetic composite roll covers in the field have been and continue to be a common ungovernable problem. Even with recent advances in resin chemistry, synthetic composite roll covers today are best performing at operating conditions wherein the maximum operating temperature does not considerably exceed 250° F., and the maximum nip pressure does not considerably exceed 10,000 p.s.i., and wherein the surface roughness of the cover is considerably below 10 Ra micro-inches.

The method and apparatus of the present invention enables the fabrication of roll covers having a tough fiber mat under layer and a high performance or engineering thermoplastic outer layer as opposed to a cover formed of a thermoset epoxy. The prior art method discussed above, wherein an epoxy impregnated strip is helically wrapped over a horizontally disposed roll core, would be unsuitable for the application of a high performance thermoplastic material. This is due to the fact that a thermoplastic extrudate alone would have insufficient viscosity to form into the shape of a cover when applied to a horizontally disposed roll core. Under the method of the present invention, the roll core is oriented vertically rather than horizontally and a mold tape is utilized which surrounds the roll core outer surface in spaced-apart relationship therewith to form a weir or application zone in which the thermoplastic material may be extruded and allowed to set up and harden. Thermoplastic materials have a number of highly desirable properties making them superior to thermoset materials such as epoxy in the fabrication of covered roll cores. This includes a higher glass transition temperature, a higher tensile strength, a higher impact strength, greater smoothness, more uniform surface finish and more homogenous physical and thermal properties. Thus, a roll core covered with a high performance thermoplastic material will achieve superior performance characteristics than one covered with a thermoset material such as epoxy resin. The method and apparatus of the present invention also enables the fabrication of rolls covered with prior art thermoset materials such as those discussed above.

OBJECTS OF THE INVENTION

Accordingly, it is a general object of this invention to provide a method and apparatus for covering a roll core that overcomes the disadvantages of prior art outer layer materials.

It is a further object of this invention to provide a cover for a roll core having an under layer that serves as a transitional layer between the roll core and a high performance thermoplastic outer or cover layer.

It is a further object of this invention to provide a cover for a roll core that more effectively adheres to the outer surface of the metal roll core it covers.

It is a further object of this invention to provide a method and apparatus for covering a roll core that minimizes internal stress build-up and thus minimizes the possibility of cracking, delamination or edge lifting.

It is a further object of this invention to provide a method and apparatus for covering a roll core which minimizes the possibility of premature failure of the covered roll core.

It is a further object of this invention to provide a method and apparatus for covering a roll core that results in a polymeric covering having a high tensile strength.

It is a further object of this invention to provide a method and apparatus for covering a roll core that results in a polymeric covering having a more suitable Young's modulus.

It is a further object of this invention to provide a method and apparatus for covering a roll core wherein the cover has a high glass transition temperature.

It is a further object of this invention to provide a method and apparatus for covering a roll core wherein the cover has a high durability and long lifespan.

It is a further object of this invention to provide a method and apparatus for covering a roll core that is less expensive than prior art methods and devices.

It is a further object of this invention to provide a method and apparatus for covering a roll core wherein the cover has an outer surface that is smoother than prior art covers formed of thermosetting materials such as epoxy resins.

It is a further object of this invention to provide a method and apparatus for covering a roll core that results in a covered roll having a cover that will not fail under extremely high pressures or high heating conditions.

It is a further object of this invention to provide a method and apparatus for fabricating a mold tape assembly having a radius of curvature that can be easily obtained based upon the outer diameter of the covered roll.

It is a further object of this invention to provide an apparatus for fabricating a mold tape assembly that enables the user to determine the radius of curvature of the resulting mold tape assembly.

It is a further object of this invention to provide a mold tape assembly that winds onto itself to form a substantially straight cylinder during fabrication of a covered roll.

It is a further object of this invention to provide a method and apparatus for fabricating a mold tape assembly wherein the height of the resulting mold tape is easily controlled.

It is a further object of this invention to provide a method and apparatus for fabricating a mold tape assembly that is multi-tiered.

It is a further object of this invention to provide a method and apparatus for covering a roll core wherein the cover has a high impact strength.

It is a further object of this invention to provide a cover for a roll core that performs consistently under extremely high pressures, high heating and high speed conditions.

It is a further object of this invention to provide a method and apparatus for covering a roll core wherein the cover has a high compression strength.

It is a further object of this invention to provide a method and apparatus for covering a roll core wherein the cover has a high thermal resistivity.

It is a further object of this invention to provide a method of fabricating and wrapping a glass or other reinforcement fiber mat under layer that minimizes surface irregularities.

It is a further object of this invention to provide a glass or other fiber mat under layer that results in improved radial, axial and circumferential tensile strength.

It is a further object of this invention to provide a glass or other fiber mat under layer that is tightly wrapped over the outer surface of the metal roll core.

It is a further object of this invention to provide a method and apparatus for covering a roll core wherein voids are minimized during the infusion of epoxy resin.

It is a further object of this invention to provide a method and apparatus for covering a roll core with a high temperature polymeric material with a high fiber concentration adhesive layer.

SUMMARY OF THE INVENTION

These and other objects of this invention are achieved by providing a method for producing a covered roll having a glass fiber or other fiber mat under layer infused with epoxy or other thermoset resin and a smooth outer layer formed of a polymeric material, preferably a high performance thermoplastic material. The mat is formed of a plurality of layers, each layer having a leading edge that abuts a following edge when wrapped over the roll core, each subsequent layer being affixed to the previous layer along a seam, the seams being spaced apart angularly from one another to prevent irregularities over the surface of the resulting covered roll core. One or more layers of the dry fiber mat such as glass fiber mat may be formed of a two-ply construction, the first ply having fibers arranged in a random pattern, the second ply having aligned fibers oriented either parallel or perpendicular to the roll core central axis. The invention also includes an improved mold tape assembly for use in applying a polymeric cover material over a roll core and an inventive apparatus for fabricating the mold tape assembly. The mold tape assembly is formed of at least two ribbons that are arranged in a substantially parallel and partially overlapping orientation, the ribbons being spot welded together at a predetermined radius of curvature. The apparatus for fabricating the mold tape assembly further includes an inventive device for aligning the ribbons prior to welding and an inventive curvature shoe for disposing the ribbons at a predetermined radius of curvature during welding.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
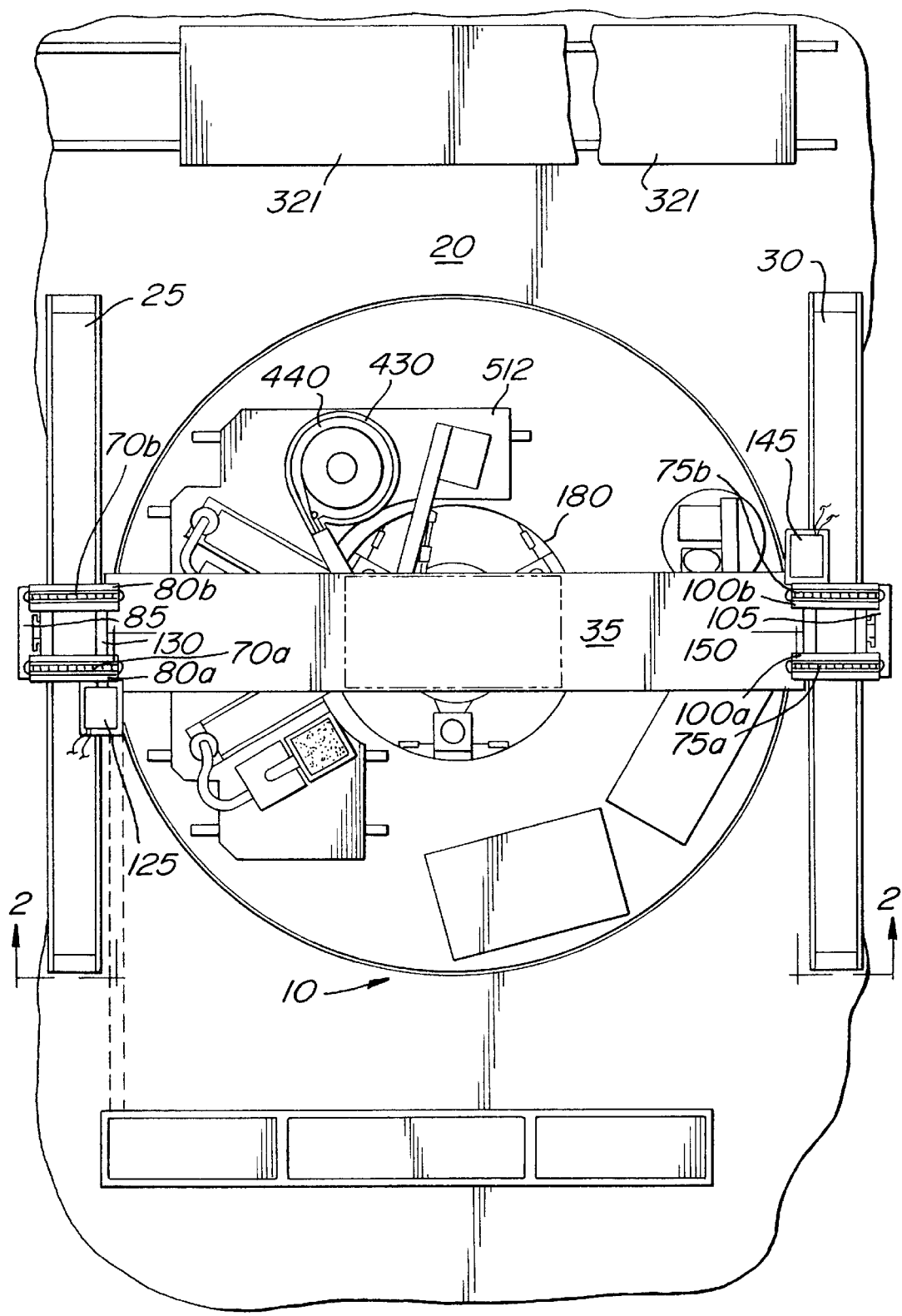
FIG. 1 is a top view of the preferred embodiment of the apparatus for covering a metal roll core with a polymeric material.
Figure 2:
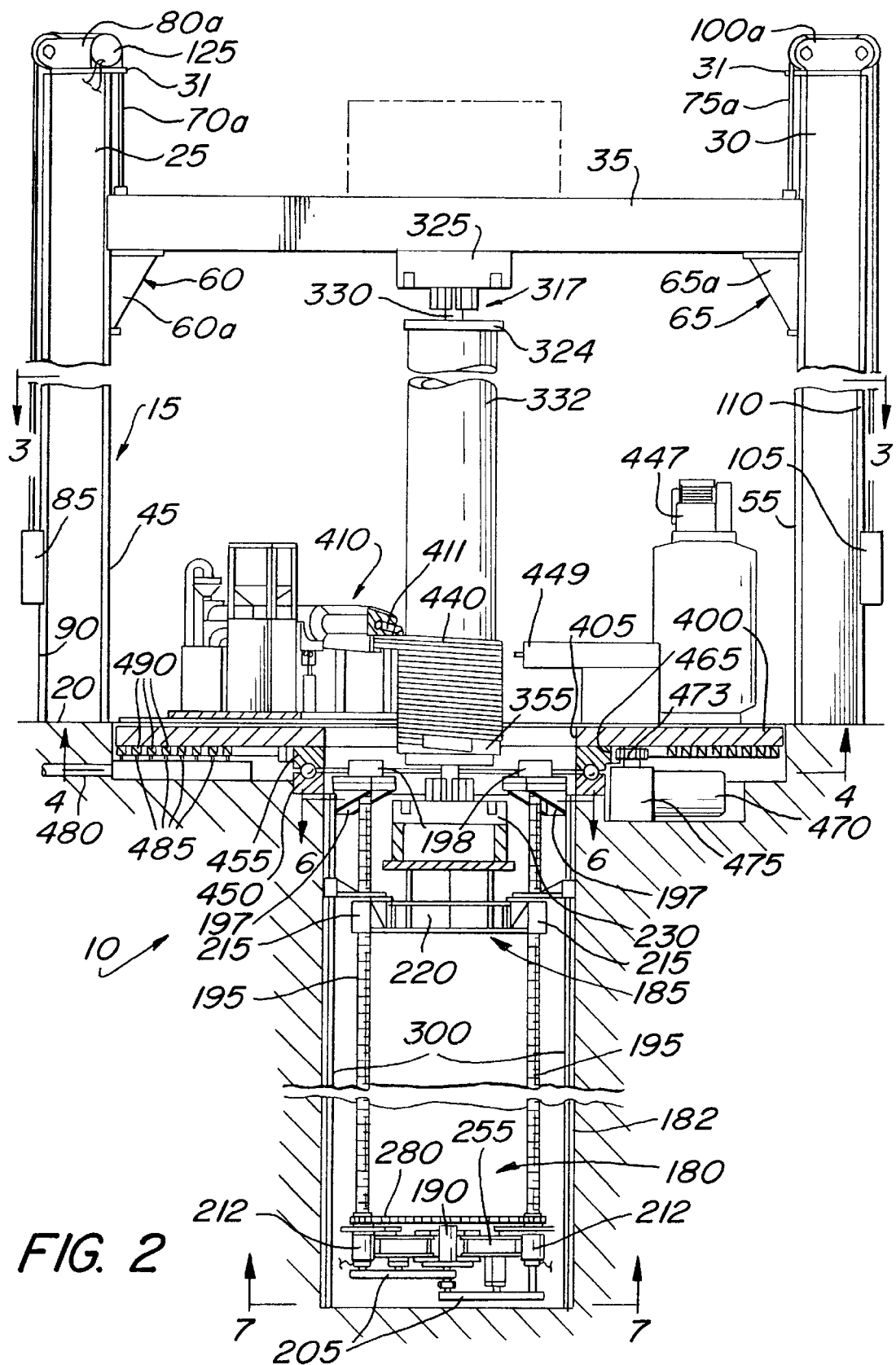
FIG. 2 is a sectional view taken along line 2—2 of FIG. 1.
Figure 19:
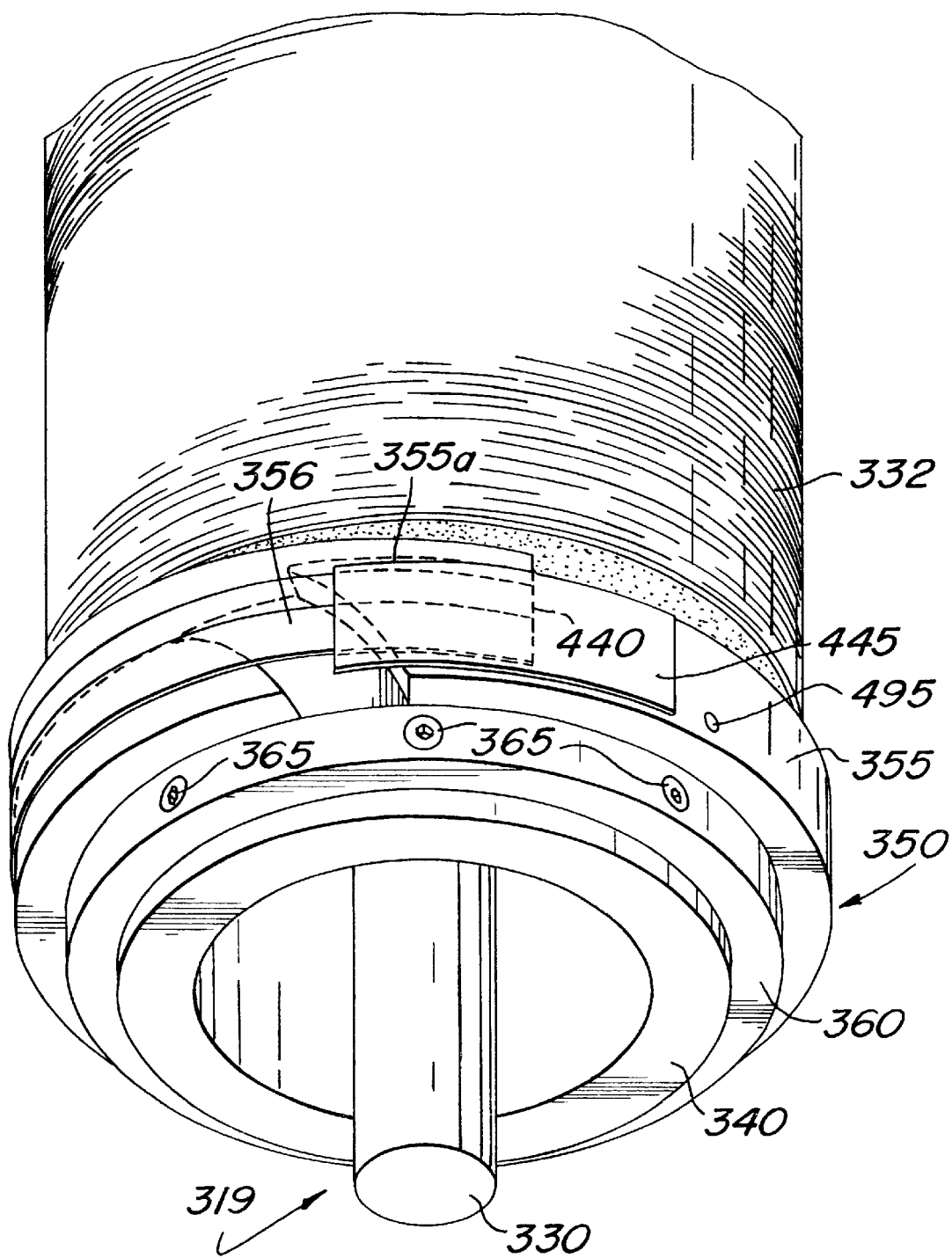
FIG. 19 is an isometric view of the bottom portion of a metal roll core with a dry reinforcement fiber mat wrapped thereover in accordance with the present invention.

Referring now in greater detail to the various figures of the drawings wherein like reference numerals refer to like parts there is shown at 10 in FIGS. 1 and 2, an apparatus for applying a polymeric material, preferably a high performance thermoplastic material, to the outer surface of a roll core. At this juncture it is important to mention that prior to placement of the roll core into the apparatus 10 shown in FIGS. 1 and 2, the roll core is wrapped tightly and densely with a dry glass fiber mat or other fiber mat layer 332 over its outer surface. FIG. 19 shows the dry glass fiber mat layer 332 wrapped over the outer surface of the roll core. The details of the construction of the glass fiber mat 332 as well as the manner in which the mat 332 is wrapped over the roll core 320 to form the layer will be explained later in this application. Suffice it for now to say that the apparatus 10 is arranged for receiving the roll core 320 with the dry glass fiber mat layer 332 already wrapped thereon. The apparatus 10 is also arranged for holding the wrapped roll core in a substantially vertical orientation and applying a layer of polymeric material over the glass fiber mat layer 332 to form a covered roll such as a large calendar roll or supercalender roll that is used in industrial environments such as paper mills where the rolls are used for transporting a web sheet of paper through a paper machine which becomes finished paper. Preferably, the polymeric covering is formed of a high performance thermoplastic material. However, the method and apparatus of the present invention also contemplates the use of other types of polymeric materials as roll covers such as other extrudable elastomers including rubbers or processable urethanes and high viscosity thermoset resins such as polyurethanes and epoxies in general.

As shown in FIGS. 1 and 2, the apparatus 10 includes a main frame assembly 15 that comprises a base portion 20 and a transverse frame assembly 35 that is horizontally disposed between a pair of side frame members 25 and 30 that are mounted to and rise vertically from the base portion 20. In the embodiment of the invention shown herein, the roll core is a conventional roll core that may be purchased from a roll core manufacturer to desired specifications, length, diameter, etc.

Figure 3:
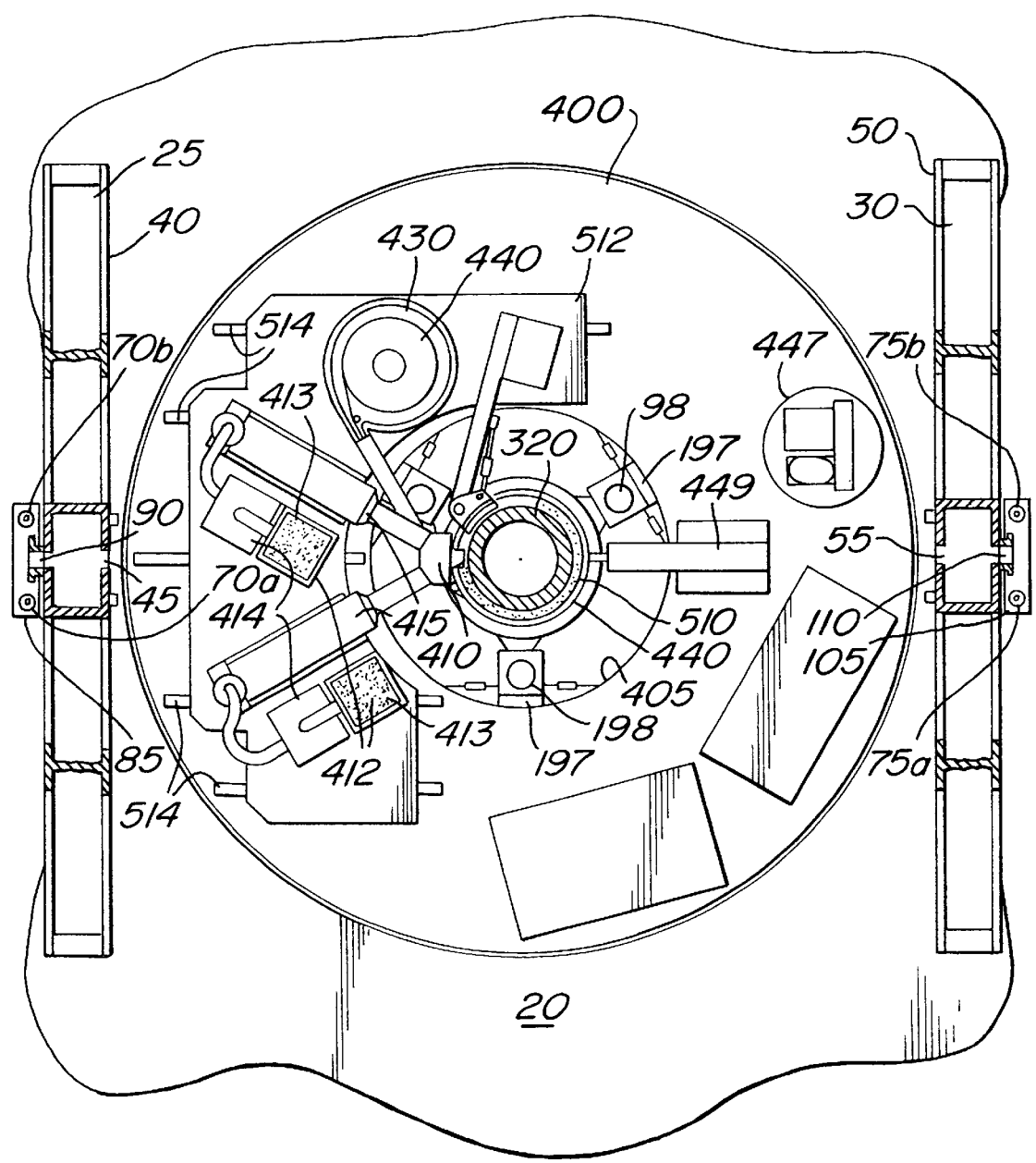
FIG. 3 is a sectional view taken along line 3—3 of FIG. 2.

As best seen in FIGS. 2 and 3, each side frame member 25 and 30 may be of any suitable height, e.g., forty feet, and may be of any suitable construction, e.g., comprised of steel I-beams. Likewise, the transverse frame member 35 is formed of any suitable rigid material, e.g., a box-beam fabrication. As best illustrated in FIG. 2, the transverse frame member 35 extends between the side frame members 25 and 30 and is arranged for vertical movement therebetween. The side frame member 25 includes an inner face 40 having precision linear tracks 45 disposed thereon running longitudinally thereon. Likewise, the side frame member 30 includes an inner face 50 having precision linear tracks 55 running longitudinally thereon. Attached to the bottom surface of the transverse frame member 35 are bracket assemblies 60 and 65 located at each end thereof. Bracket assembly 60 includes a web portion 60a that includes guide bearings (not shown) arranged to be disposed over the precision linear tracks 45 to enable sliding attachment of the transverse frame member 35 to the precision linear tracks 45. Likewise, the bracket assembly 65 includes a web portion 65a that includes guide bearings (not shown) arranged to be disposed over the precision linear tracks 55 to enable sliding attachment of the transverse frame member 35 to the precision linear tracks 55. In this manner, the transverse frame member 35 may be moved vertically from an elevated position near the top of the side frame members 25 and 30 downwardly to a lowered position near the bottom of the side frame member 25 and 30. Additionally, each side frame member 25 and 30 is provided with a limit stop 31 at the top thereof to prevent further upward movement of the transverse frame member 35 beyond the elevated position.

The main frame assembly 15 also comprises a counterweight assembly for suspending the transverse frame member 35 between the side frame members 25 and 30 and countering the weight of the transverse frame member 35. Referring now to FIGS. 1 through 3, the counterweight assembly includes a pair of roller chains 70a and 70b attached at one end to the transverse frame member 35. The roller chains 70a and 70b extend over assemblies 80a and 80b, respectively, each comprising a pair of roller chain sprockets located at the top of the side frame member 25. The roller chains 70a and 70b are attached at their opposite ends to a counterweight 85. As best shown in FIG. 3, the counterweight 85 travels along a longitudinal rail 90 disposed over the outer face of the side frame member 25. Likewise, a pair of roller chains 75a and 75b extend over assemblies 100a and 100b, each comprising a pair of roller chain sprockets located at the top of the side frame member 30. The roller chains 75a and 75b are attached at their opposite ends to a counterweight 105 that, like counterweight 85, travels on a longitudinal rail 110 (FIG. 3).

Prior to positioning a roll core vertically within the apparatus 10, in a manner to be described below, the transverse frame member 35 must be moved to or near its elevated position. Referring now to FIGS. 1, 2 and 3, in order to raise the transverse frame member 35 to the elevated position, an electric drive assembly 145 is drivingly connected to one of the roller chain sprockets at 100b at the top of the side frame member 30. The electric drive assembly basically comprises an electric motor in communication with a gear reducer (not shown) through a clutch brake (not shown) which is drivingly connected to one of the roller chain sprockets within the assembly 100b. The motor driven roller chain sprocket within the assembly 100b is connected to a roller chain sprocket within the assembly 100a through a drive axle 150 disposed therebetween. Thus, through its connection with roller chain sprockets located within both assemblies 100a and 100b, the electric drive assembly 145 drives the roller chains 75a (best shown in FIG. 2) and 75b (shown in FIG. 3 only) which connect to transverse frame member 35 at one end and to the counterweight 105 at the other end. Similarly, an electric drive assembly 125, constructed of the same elements as the drive assembly 145, is drivingly connected to one of the roller chain sprockets within assembly 80a at the top of the side frame member 25. The motor driven roller chain sprocket within the assembly 80a is connected to a roller chain sprocket within the assembly 80b through a drive axle 130 disposed therebetween. Thus, in a similar manner, the electric drive assembly 125 drives the roller chains 70a and 70b which connect to transverse frame member 35 at one end and to the counterweight 85 at its opposite end. The drive assemblies 125 and 145 are arranged to operate in synchronization to assure balanced raising and lowering of the transverse frame assembly 35.

Alternatively, one of the drive assemblies, i.e., drive assembly 125, could be eliminated by utilizing a lightweight torque tube having right-angle gear box at opposite ends (not shown). In particular, at one of its ends, the torque tube could be connected to a right-angle gear box, the output of which is connected to the roller chain sprocket within assembly 100a. The torque tube extends above the transverse frame member 35 from the side frame member 30 to the side frame member 25. At its opposite end, the torque tube drives the other right-angle gear box which is connected to a roller chain sprocket within assembly 80a. In this manner, the need for a second, simultaneously driven, drive assembly 125 is eliminated. Thus, through the torque tube (not shown) and drive axles 130 and 150, raising and lowering of the transverse frame member 35 may be accomplished in a balanced and synchronized manner utilizing the single drive assembly 145. Due to the fact that counterweights are provided, the electric drive assembly 145 needs to exert only a small amount of lifting force to raise the transverse frame member 35.

Figure 5:
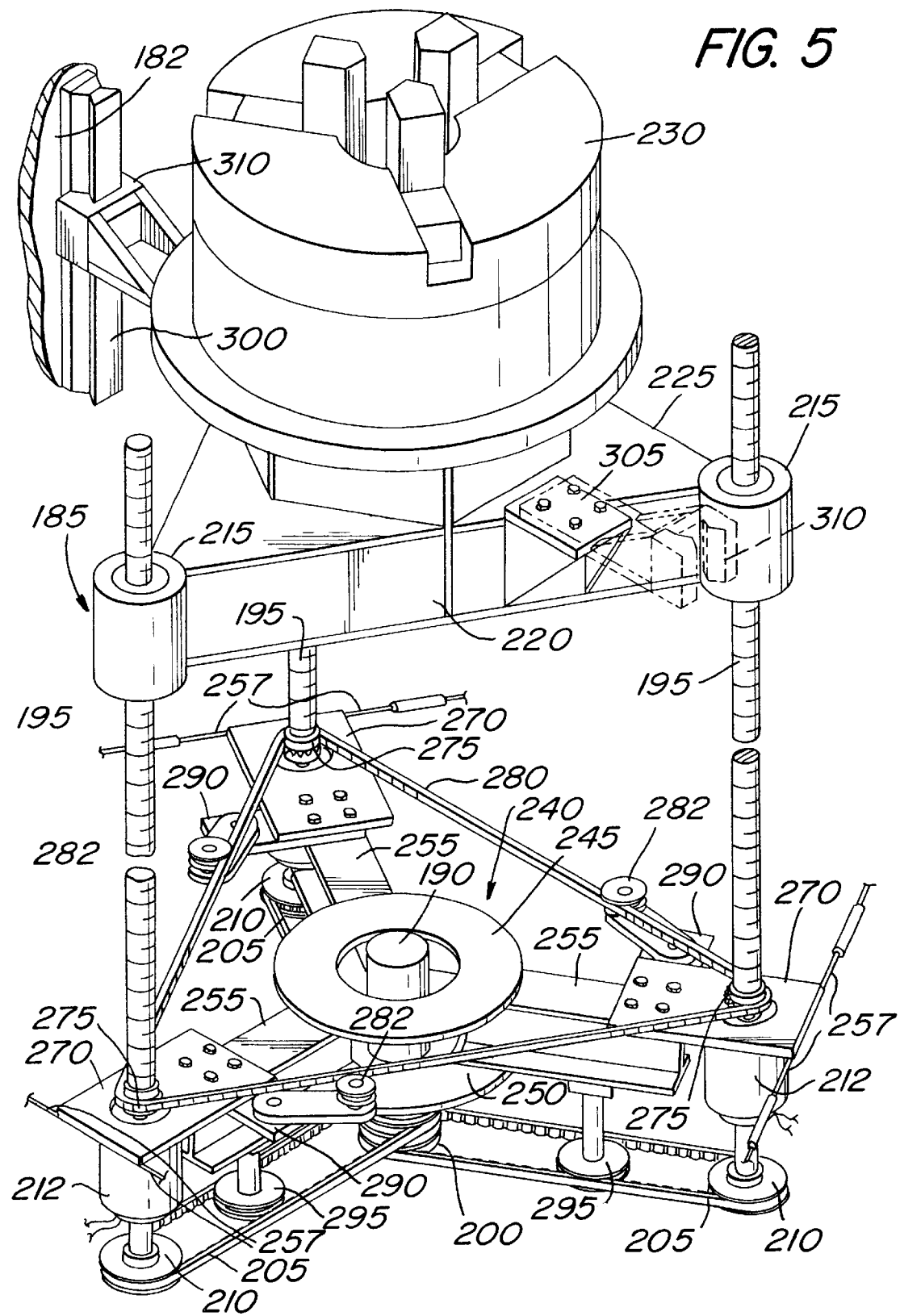
FIG. 5 is an isometric view of the motor driven elevator assembly which forms a portion of the apparatus of the present invention.

Referring again to FIGS. 1 and 2, the base portion 20 additionally comprises a central opening 180 that is generally cylindrical in shape and includes a vertical wall 182 formed of any suitable material, e.g., a steel cylinder one-inch in thickness. The vertical wall 182 may be waterproof. The central opening 180 may be of any dimensions sufficiently large to house a motor driven elevator assembly 185 (FIG. 5) located therein, e.g., forty-four feet deep and seven feet in diameter. Referring now to FIG. 5, the motor driven elevator assembly 185 comprises a motor 190 that is drivingly connected to a plurality of gear reducers 212, the output shafts of which are connected to a plurality of threaded ball screw shafts 195 that rotate in synchronization in response to operation of the motor. Each ball screw shaft 195 is affixed adjacent the vertical wall 182 and is suspended therefrom within the central opening by means of a bracket 197 (FIG. 2). The opposite driven end of each ball screw shaft 195 suspends freely within the central opening 180. As best shown in FIG. 2, each ball screw shaft 195 is mounted within a conventional bearing housing 198 that permits rotational movement of the ball screw shaft 195. Referring again to FIG. 5, the motor 190 is provided with a drive pulley 200 that extends below the motor 190 and can accommodate a plurality of continuous loop drive timing belts 205 extending thereover. The drive timing belts 205 also extend over timing belt sprockets 210 to enable synchronous rotation of the ball screw shafts 195. A gear reducer mechanism 212 is provided between each timing belt sprocket 210 and each ball screw shaft 195 for the purpose of reducing the revolutions per minute from the timing belt sprocket 210 to the ball screw shaft 195. The gear reducer 212 may be of any suitable construction that couples the ball screw shaft 195 and the timing belt sprocket 210.

As best shown in FIG. 5, disposed over each ball screw shaft 195 is an internally threaded moveable ball nut element 215 that moves vertically and non-rotationally in response to rotational movement of the ball screw shaft 195. The moveable ball nut elements 215 are affixed at the corners of a generally triangular platform assembly 220 comprising a horizontal plate 225 on which an upwardly facing universal chuck 230 is fixedly secured. The upwardly facing chuck is arranged for receiving the bottom end of the roll core. Thus, upon motor driven synchronous rotation of the ball screw shafts 195 in one direction, the platform assembly 220 is caused to move upwardly. Likewise, motor driven synchronous rotation of the ball screw shafts 195 in the opposite direction causes the platform assembly 220 to move downwardly. Like the transverse frame member 35, the platform assembly 220 is arranged for movement within the central opening 180 from an elevated position wherein the moveable ball nut elements 215 are located near the top of the ball screw shafts 195 adjacent the brackets 197 to a lowered position wherein the moveable ball nut elements 215 are positioned just above chain sprockets 275.

The motor 190 is housed at the center of a frame assembly 240 that comprises a central portion formed of two circular plates 245 and 250 each having a central opening in which the motor 190 is disposed. The frame assembly 240 also comprises arms 255 that extend radially at 120° intervals from the central portion. Each arm 255 is formed of a steel I-beam that includes a vertical web disposed between two horizontal webs. Each arm is secured at its proximal end to the central portion by any suitable means, e.g., welding. Specifically, circular plate 245 is secured to the top surface of the arms 255 while circular plate 250 is secured in a similar manner to the bottom surface of these arms. A bracket 270 is secured at the distal end of each arm 255 to the top surface thereof by any suitable means, e.g., bolting.

Figure 7:
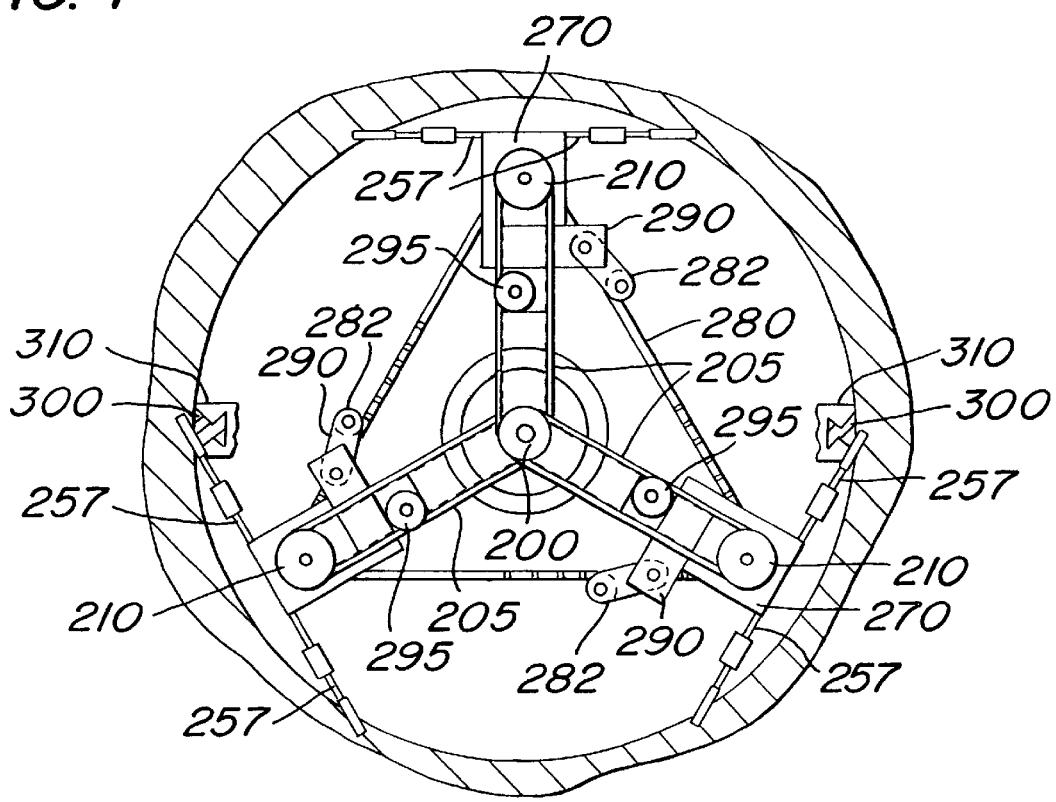
FIG. 7 is a sectional view taken along lines 7—7 of FIG. 2.

Referring now to FIGS. 5 and 7, the entire frame assembly 240 is secured to the vertical wall 182 by a plurality of anchoring rods 257, each rod being provided with a threaded portion and an internally threaded turnbuckle disposed thereover to enable tightening and loosening of each anchoring rod 257. Each anchoring rod 257 comprises a first end arranged for attachment to the bracket 270 located at the distal end of each arm 255 and a second end arranged for attachment to the vertical wall 182 of the opening 180. As best shown in FIG. 7, the anchoring rods 257 are arranged in pairs and are oriented tangentially with respect to the direction of rotational movement of the electric motor 190 for the purpose of reducing swinging and vibrations resulting during operation of the electric motor 190 while allowing for thermal and load induced length changes of the ball screw shafts 195.

Each bracket 270 includes an internal bore through which one of the ball screw shafts 195 is disposed. Each ball screw shaft 195 is provided with an additional chain sprocket 275 located just above each bracket 270. A continuous safety chain 280 extends over the chain sprockets 275. The safety chain 280 is provided to assure continued rotation of the ball screw shafts 195 in a synchronized manner in the event of a drive timing belt 205 failure during operation of the apparatus 10. A plate 290, secured between each bracket 270 and the top surface of each arm 255, serves as a mounting surface for a tensioning roller assembly 282 that abuts the safety chain in order to provide tension thereto. Similarly, a plurality of roller assemblies 295 extending downwardly from the bottom surface of arms 255 provide tensioning to the drive timing belts 205.

Figure 6:
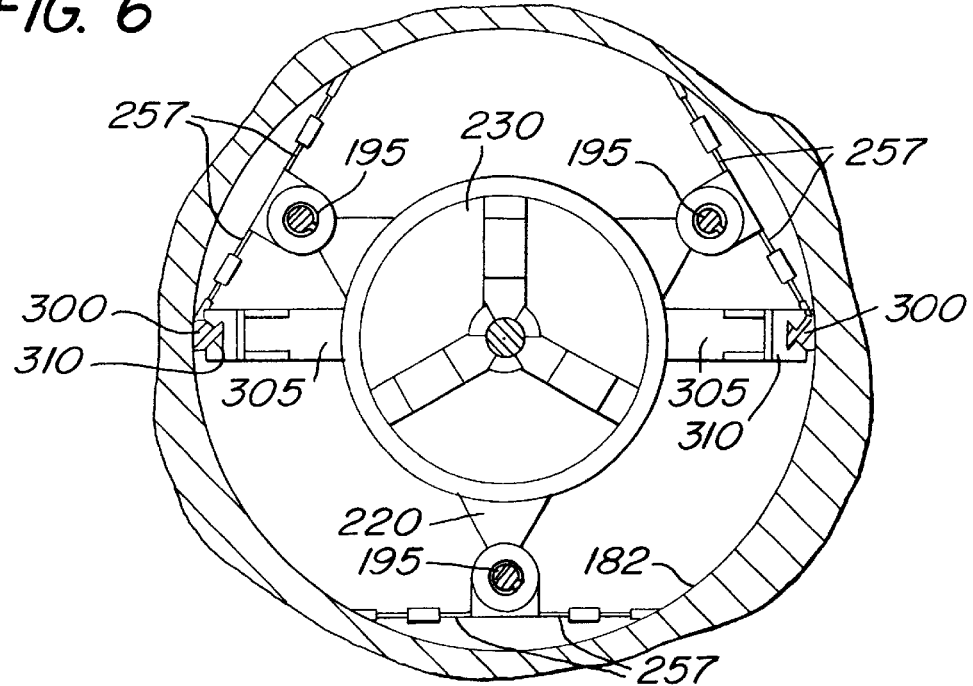
FIG. 6 is a sectional view taken along lines 6—6 of FIG. 2.

As best shown in FIGS. 5 and 6, a pair of linear guide rails 300 are disposed vertically in opposing relation on the vertical wall 182 of the opening 180. Bracket assemblies 305 secured to opposite ends of the triangular platform assembly 220 include linear bearings 310, each linear bearing being arranged to be disposed over each of the linear guide rails 300 to enable vertical sliding movement of each linear bearing over the length of the guide rails 300. Attachment of the triangular platform assembly 220 to the guide rails 300 in this manner prevents rotational and lateral movement of the platform assembly 220 during raising and lowering.

Figure 9:
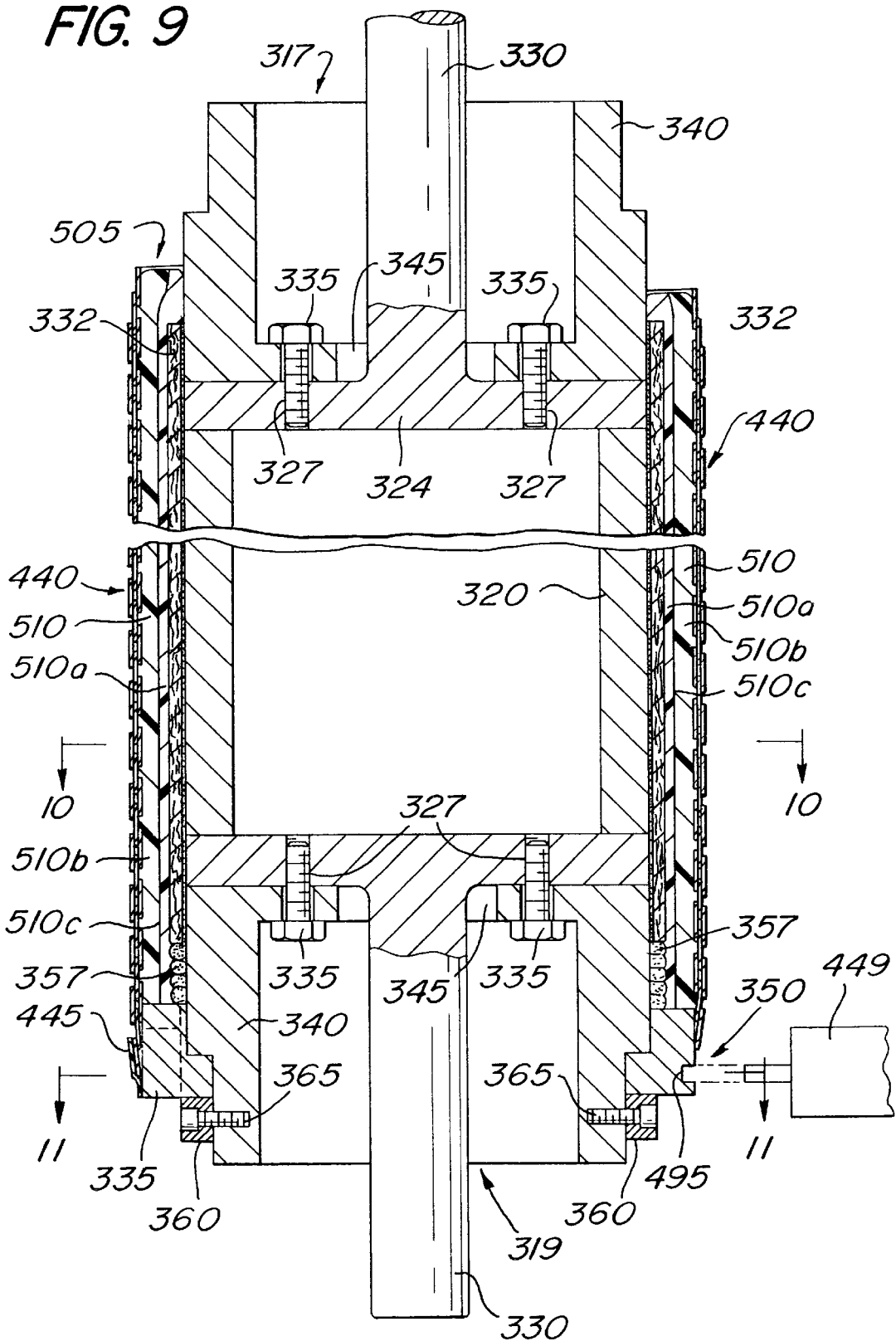
FIG. 9 is a partial sectional view of a metal roll core covered with a reinforcement fiber mat under layer and a polymeric outer layer, preferably formed of a high performance thermoplastic material in accordance with the present invention.

Referring now to FIGS. 2 and 9, a roll core 320, with the glass fiber mat 332 wrapped thereover, is shown disposed between the upwardly facing universal chuck 230 and a downwardly facing universal chuck 325 disposed on the bottom surface of the transverse frame member 35. When placed within the apparatus 10 in this vertical orientation, the roll core comprises a top end 317 and a bottom end 319. The universal chucks are aligned to assure substantially vertical orientation of the roll core 320. The roll core 320 is of a predetermined length and is generally cylindrical in shape and includes a central axis and an outer surface formed of any suitable material, e.g., metal or a. As mentioned earlier and in accordance with the present invention, prior to placement of the roll core between the opposed chucks 230 and 325, the roll core is wrapped with a dry glass fiber mat layer 332 over its outer surface. Accordingly, as shown in FIG. 2, the roll core 320 is shown disposed between the opposed chucks with the dry glass fiber mat layer 332 already wrapped thereover. The details of the construction of the glass fiber mat 332 as well as the manner in which the mat is wrapped over the roll core to form a layer will be explained later in this application.

As best shown in FIG. 9, the metal roll core 320 additionally comprises end caps 324 that are secured to the ends thereof by any suitable means. The end caps 324 have a circumference approximately the same as that of the roll core and include journals 330 that are concentric with the central axis of the metal roll core 320 and enable securement of the metal roll core 320 within the opposed universal chucks 230 and 325. The end caps 324 are provided with threaded openings 327 to enable the attachment of extension segments 340 thereto by any suitable means, e.g., bolts 335. Each extension segment 340 is provided with a circumference approximately equal to that of the roll core and further comprises a central opening 345 for disposition of the extension segment 340 over the journal 330 to enable attachment of the extension segment 340 to the end cap 324. At this juncture, it is important to mention that the extension segments 340 shown in the figures and the manner in which they are illustrated as attaching to the roll core end caps 324 is merely exemplary. There are a variety of differently constructed extension segments that may be adapted to enable attachment to roll cores in a variety of ways. A gasket (not shown) may be inserted between the extension segment 340 and the end cap 324 to assure an airtight seal therebetween. Further, a spacer assembly 350 is arranged for attachment to the bottom end 319 of the roll core 320 over the extension segment 340 located thereon. As best seen in FIGS. 9 and 19, the spacer assembly 350 comprises a spacer ring 355 and a locking ring 360. The spacer ring 355 has an outer circumference that is larger than that of the roll core 320 and is slidably mounted over the extension segment 340 by means of the locking ring 360. In particular, as best shown in FIG. 9, the spacer ring 355 is brought into abutting relationship with the extension segment 340 and the locking ring 360 abuts the spacer ring 355 and is fixedly secured to the extension segment 340 by any suitable means, e.g., bolts 365. By attachment of the spacer ring 355 in this manner, it may slidably rotate concentrically about the outer surface of the extension segment 340.

Referring again to FIG. 19, the spacer ring 355 includes a slightly inclined top surface 355a which extends approximately one revolution around the roll core to form a ramp. The amount of incline over the entire length of the top surface 355a, e.g., 0.50 inches, is based upon the rate of downward movement of the roll core 320, e.g., 0.50 inches per rotation of a turntable 400 discussed below. The spacer ring 355 is also provided with an opening 356 through which roll cover material may be extruded while start-up adjustments are made to the extruder in a manner to be discussed in detail below.

Referring now to FIGS. 2 and 3, the apparatus 10 also includes a turntable 400 which includes a central opening 405 that is circular, concentric with, and substantially equal in diameter to the central opening 180 in the base portion 20. As a result, when located between the opposed universal chucks 325 and 230 and secured therein, the roll core 320 may be lowered from an elevated position, wherein the entire roll core 320 including its bottom end 319 thereof is disposed above the base portion 20 and turntable 400, to a lowered position wherein the roll core length 320 is disposed within the central opening 405 of the turntable and within the central opening 180 of the base portion.

Figure 4:
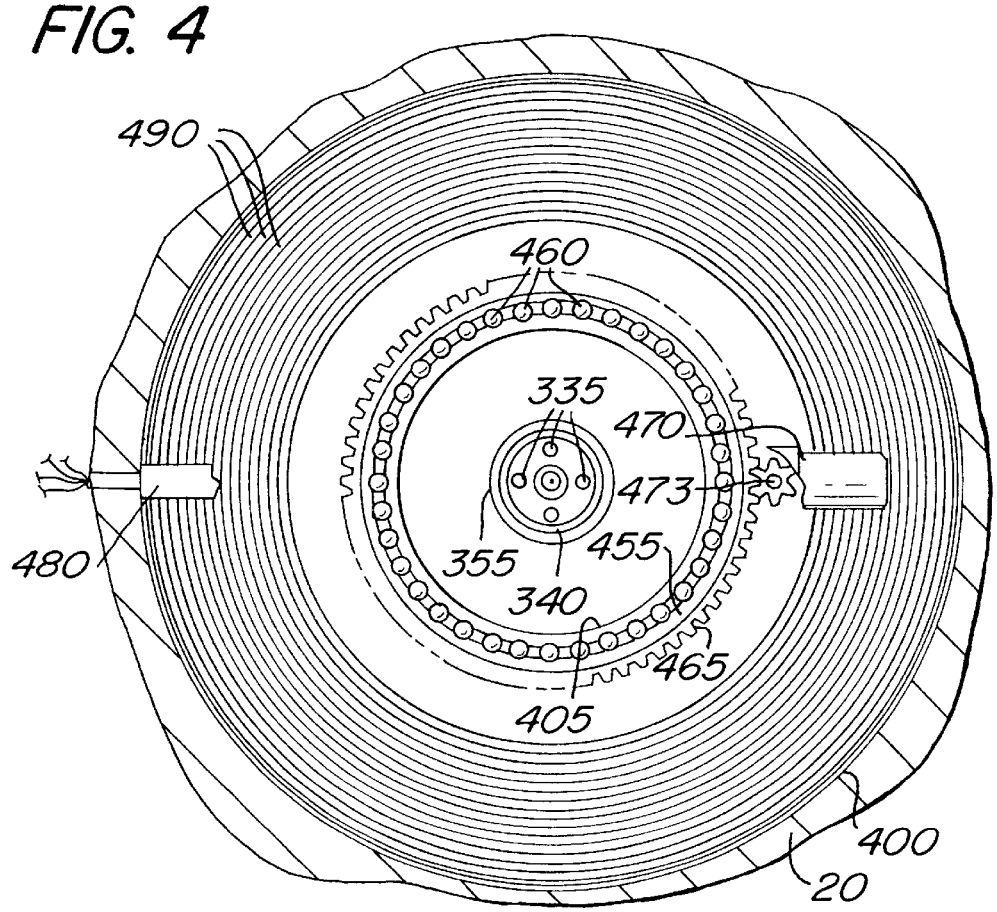
FIG. 4 is an enlarged sectional view taken along line 4—4 of FIG. 2.

Referring now to FIGS. 2 and 4, the turntable 400 is rotatably mounted to the base portion 20 by means of a race assembly that includes an upper race 455 (best shown in FIG. 4) that is attached to the underside of the turntable 400 and a lower fixed race 450 (best shown in FIG. 2) that is attached to a portion of the base portion 20. Together, the lower and upper races form a raceway in which ball bearings 460 are disposed thus enabling rotatability of the turntable 400 over the base 20. The center of rotation of the turntable is aligned with the central axis of the upper and lower chuck assemblies 325 and 230. Referring again to FIG. 2, a motor 470, having an associated gear reducer 475, is mounted to a surface of the base portion 20 below the turntable 400. The motor 470 is drivingly connected to the turntable 400 by means of connection of the gear reducer's gear wheel 473 with a ring gear 465 integral to the upper race 455 (best shown in FIG. 4) located on the underside of the turntable 400. Thus, the motor 470 and its associated gear reducer 475 control rotational movement of the turntable 400.

In FIGS. 2 and 3, several devices are shown mounted to a platform 512 that is moveably secured within a plurality of elongated slots 514 located on the turntable 400. These devices include an extruder assembly 410, a mold tape dispenser 430 for dispensing a length of mold tape 440 spooled thereon, a pin indexing device 449 and other devices to be discussed below. In this manner, the platform 512 may be moved along the elongated slots 514 to adjust the distance of the platform mounted devices from the roll core thus enabling the thickness of the filament 510 to be adjusted prior to application to the dry glass fiber mat layer 332 applied previously. In other words, the adjustable platform 512 allows radial positioning of the equipment in reference to the radial dimension of the roll core. Alternatively, these devices could be mounted directly to the turntable. Because the turntable 400 is rotatably mounted to the base portion 20, it enables movement of these devices in a circular path around the roll core 320 while the roll core remains non-rotational and is lowered from its elevated position downwardly so that a layer of polymeric material or filament may be added over the dry glass fiber mat layer 332 applied previously. The extruder assembly 410 operates in a way known by those practiced in the art and comprises a plurality of bins 412, e.g., two, in which pelletized polymeric material 413 may be placed. The pelletized polymeric material 413 falls by gravity from each bin 412 into a hopper 414 connected thereto. From each hopper 414, the pelletized polymeric material is transported into an extruder 415. Each extruder 415 extrudes the polymeric material into a common feeding head 411 (best shown in FIGS. 2 and 3) which applies a filament 510 of the polymeric material to the roll core outer surface 322.

Figure 10:
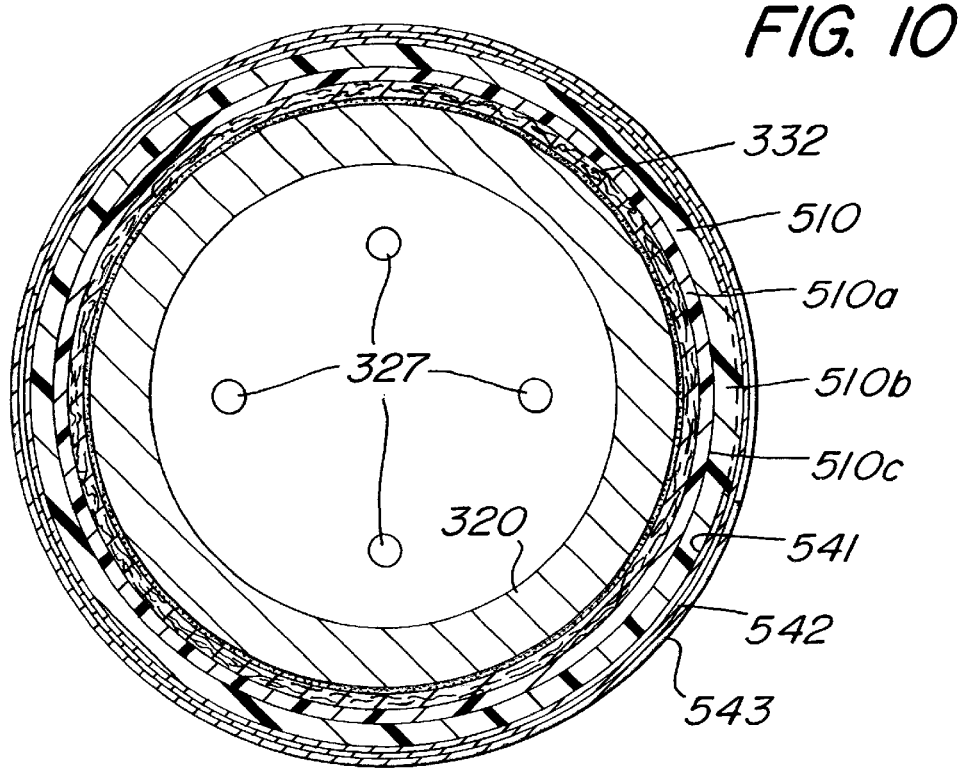
FIG. 10 is a sectional view taken along line 10—10 of FIG. 9.

Because the feeding head 411 is common to several extruders 415, several different polymeric materials each having a different amount of filler or additive may be combined in the feeder head 411 and applied to the dry fiber mat layer 332 to form a polymeric filament 510 comprised of several discrete layers, each layer having different mechanical properties. For example, one of the bins 412 may be loaded with pelletized thermoplastic material 413 having a low fiber concentration or no fiber content at all while the other is loaded with pelletized thermoplastic material 413 having a higher fiber concentration. The fibers being utilized may be glass fibers, carbon fibers and/or aramid fibers. Referring now to FIGS. 9 and 10, in this manner, the two different thermoplastic materials converge in the feeding head 411 and the resulting extrudate is a dual layer filament 510 comprising a thermoplastic under stock 510a having a higher fiber content and a top stock 510b having a lower fiber content or no fiber content. Employing a higher fiber content in the thermoplastic under stock 510a results in lowering the coefficient of thermal expansion of this layer to a level which is closer to that of the metal surface 322 of the roll core thus resulting in minimizing residual stresses upon hardening. For example, if glass, carbon or aramid fiber is employed in the understock, a recommended amount is 10–40% by weight of those fibers. Employing a higher fiber content in the under layer 510a improves toughness, increases thermal conductivity, thermal stability and impact resistance and minimizes residual stresses upon hardening. The lower fiber concentration of the top stock 510b of the filament 510 results in a softer and smoother outer surface which provides desired operating characteristics. For example, if glass fiber is employed in the top stock 510b, a recommended amount is 0–20% by weight glass fiber and preferably 10%. If aramid fiber such as Kevlar fiber is employed in the top stock, a recommended amount is 0–15% by weight Kevlar fiber and preferably 8–9%. If carbon fiber is employed in the top stock 510b, a recommended amount is 0–20% by weight carbon fiber and preferably 10%. Alternatively, both the under stock 510a and the top stock 510b may be formed of thermoplastic material having the same composition including fiber content. Additives other than fibers may be added to the thermoplastic material to change the mechanical properties of the layers.

Under the invention, there are many different suitable polymeric materials including high performance thermoplastic materials and thermosetting materials that may be employed in the filament 510 for covering the dry fiber mat layer 332. Example thermoplastic materials that are particularly suitable for polyetherimide or polyethersulfone, polyphenylene sulfide, polyphenylene oxide, or polyetheretherketone. There are a number of advantages to utilizing a high performance or engineering thermoplastic material as the filament 510 as opposed to thermosetting materials, such as a fibrous carrier soaked in an epoxy resin, which is utilized under the prior art. Most importantly, a filament 510 comprised of a high performance thermoplastic material results in significantly higher performance characteristics, e.g., higher tensile strength, higher thermal resistivity, higher surface smoothness, greater durability, and longer lifespan. Other viscous thermoset materials such as polyurethane and epoxy may be applied to the dry fiber mat outer surface 332 in accordance with the method and utilizing the apparatus of the present invention.

Referring again to FIGS. 2 and 4, at this juncture it is important to mention that each of the devices mounted to the rotatable turntable 400 requires electrical power to operate. As best shown FIG. 2, electrical power and control signal communication for the turntable-mounted devices are provided from an outside source through cables 480 which are in communication with a plurality of conductive brushes 485 which are in electrical contact with a plurality of concentrically mounted slip rings 490 disposed on the underside of the turntable 400 (also shown in FIG. 4). In this manner, electricity is conducted from the slip rings up through the turntable 400 to provide continuous electrical power and process control to the turntable mounted devices while the turntable is stationary and while the turntable is rotating.

The process for wrapping the glass fiber mat layer 332 over the roll core outer surface 322 and for extruding polymeric material 510 over the glass fiber mat layer 332 will now be discussed in detail as a typical case for utilizing the method and apparatus of the present invention. At the start of the process, a spent roll core 320 is returned from a customer such as a paper mill, textile mill or magnetic film manufacturer where such covered rolls are utilized in manufacturing finished products. The roll core is returned from the customer with the cover substantially consumed and, therefore, a new cover must be applied. First, after cover material has been physically removed, the roll core outer surface 322 must be thoroughly cleaned in ways known to those practiced in this art to remove all remaining cover material. The cleaning process includes degreasing or removing all greases and/or oils remaining on the roll core outer surface 322 by utilizing known solvents and solutions. After the degreasing step, the extension segments 340 are fixedly secured to the ends of the roll core 320 in the manner described above. Next, the entire roll core outer surface 322 with the extension segments 340 fixedly secured thereto is shot blasted for the purpose of removing all rust, dirt and remaining roll cover materials. After shot blasting, a chemical solution is brushed onto the freshly shot blasted roll core outer surface 322 in ways known to those practiced in the art. The chemical solution facilitates oxidation of the roll core outer surface 322 to enhance its adhesion with epoxy which will be applied as a primer, or infused into the glass fiber mat layer 332 later in the process when it is decided not to utilize a primer. Next, a layer of liquid epoxy primer 331 (FIG. 22) is applied over the entire outer surface of the roll core 320 to enable adhesion with the dry glass fiber mat 332 which is wrapped thereover.

Figure 20:
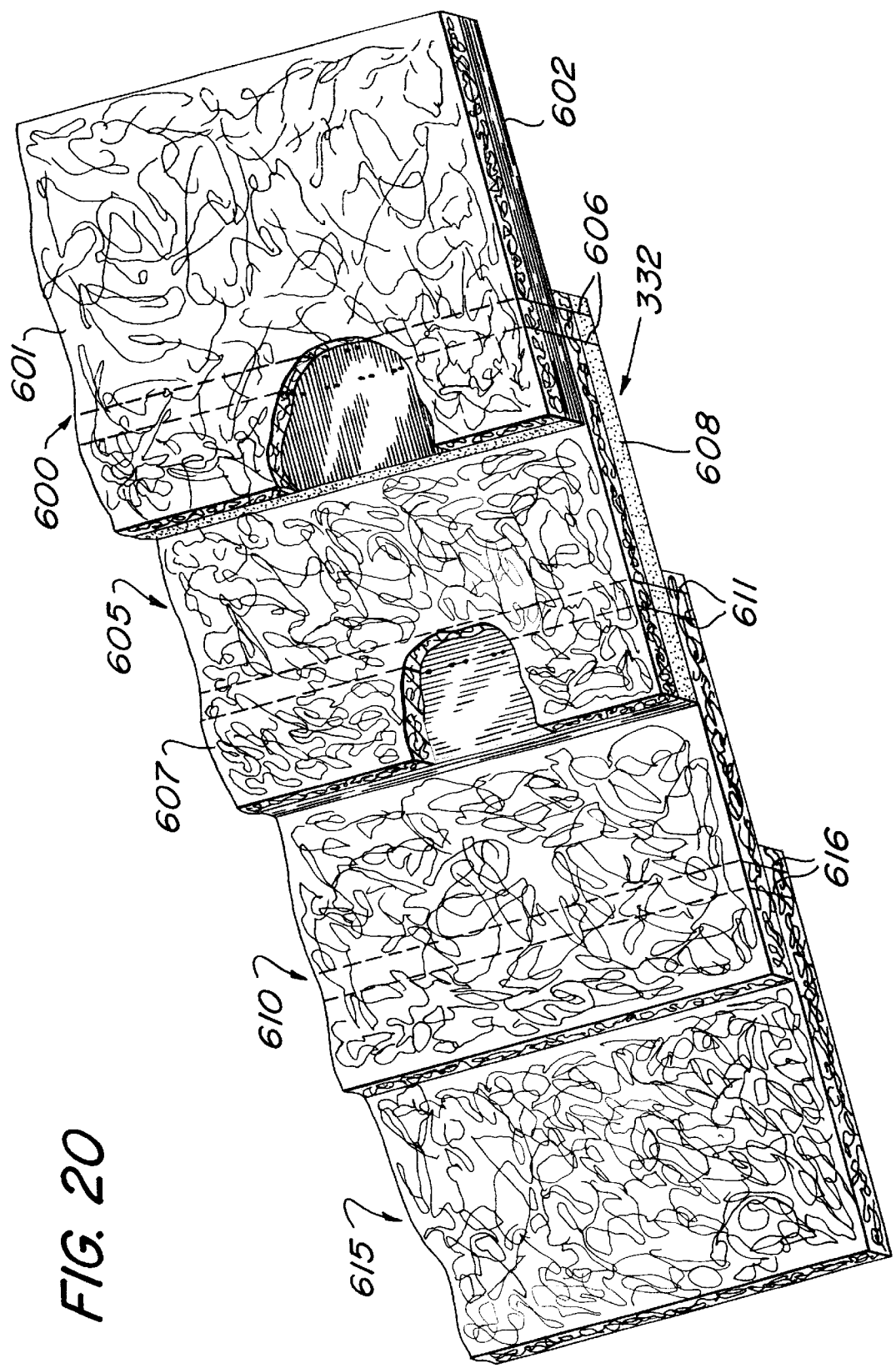
FIG. 20 is an isometric view of the dry glass fiber mat under layer fabricated in accordance with the present invention.
Figure 21:
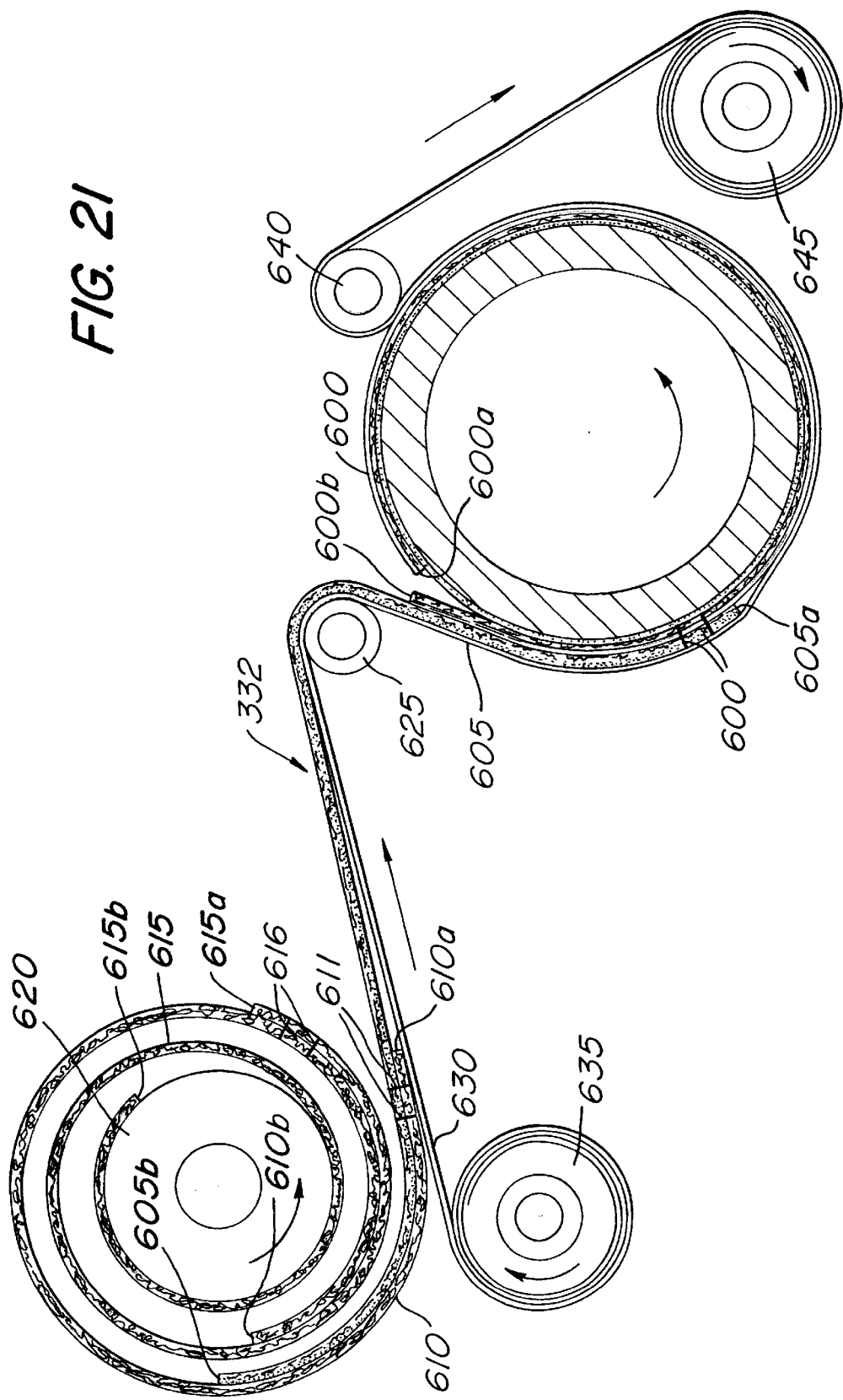
FIG. 21 is a view demonstrating wrapping of the dry glass fiber mat under layer to the metal roll core by utilizing a carrier mat in accordance with the present invention.

Referring now to FIGS. 20 and 21, the glass fiber mat 332 comprises a plurality of layers of glass fiber material including an inside layer 600, a second layer 605, a third layer 610 and an outside layer 615. As best shown in FIG. 21, the second layer 605 is affixed near its leading edge 605a to the inside layer 600 by any suitable means, e.g., stitches 606, located approximately one quarter along the length of the inside layer 600 from the leading edge 600a thereof to form a seam. Likewise, the third layer 610 is affixed near its leading edge 610a to the second layer 605 by any suitable means, e.g., stitches 611, located approximately one quarter along the length of the second layer 605 from the leading edge 605a thereof to form a seam. Finally, the outside layer 615 is affixed near its leading edge 615a to the third layer 610 by any suitable means, e.g., stitches 616, located approximately one quarter along the length of the third layer 610 from the leading edges 610a thereof to form a seam.

As best shown in FIG. 21, the roll core is oriented horizontally for the wrapping of the dry glass fiber mat 332 thereover. At this juncture it is important to mention that the glass fiber mat 332 is applied over the roll core outer surface tightly under high pulling tension in a dry condition and without the addition of any epoxy resin thereto. It is not until after the polymeric layer 510 is wound over the mat 332 and allowed to cool to appropriate temperature thereon that liquid epoxy resin is infused through the polymeric layer 510 and into the dry glass fiber mat 332 and allowed to cure therein. The manner for infusing the epoxy resin will be explained in detail below.

The leading edge 600a of the inside layer 600 is first applied to the roll core outer surface 322 that has been primed with epoxy. Thereafter, the dry glass fiber mat 332 is unwound from a spool 620 and conveyed over a roller 625 where it is thereafter tightly wrapped onto the roll core outer surface 322. Simultaneously, a length of carrier material 630, e.g., paper, wound on a dispensing roller 635 is unspooled therefrom and conveyed with the mat 332 over the roller 625. The carrier material 630 travels with the mat 332 as the mat 332 wraps around a major portion of the roll core outer surface 322. In this manner, the carrier material 630 acts to support the dry glass fiber mat 332 and assure a tight wrap over the roll core outer surface 322. The carrier material 630 is directed away from the roll core outer surface 322 by a second roller 640 and is taken up on roller 645. At this juncture, it is important to mention that under the embodiment being described herein, no preheating of the roll core outside surface is necessary.

Figure 22:
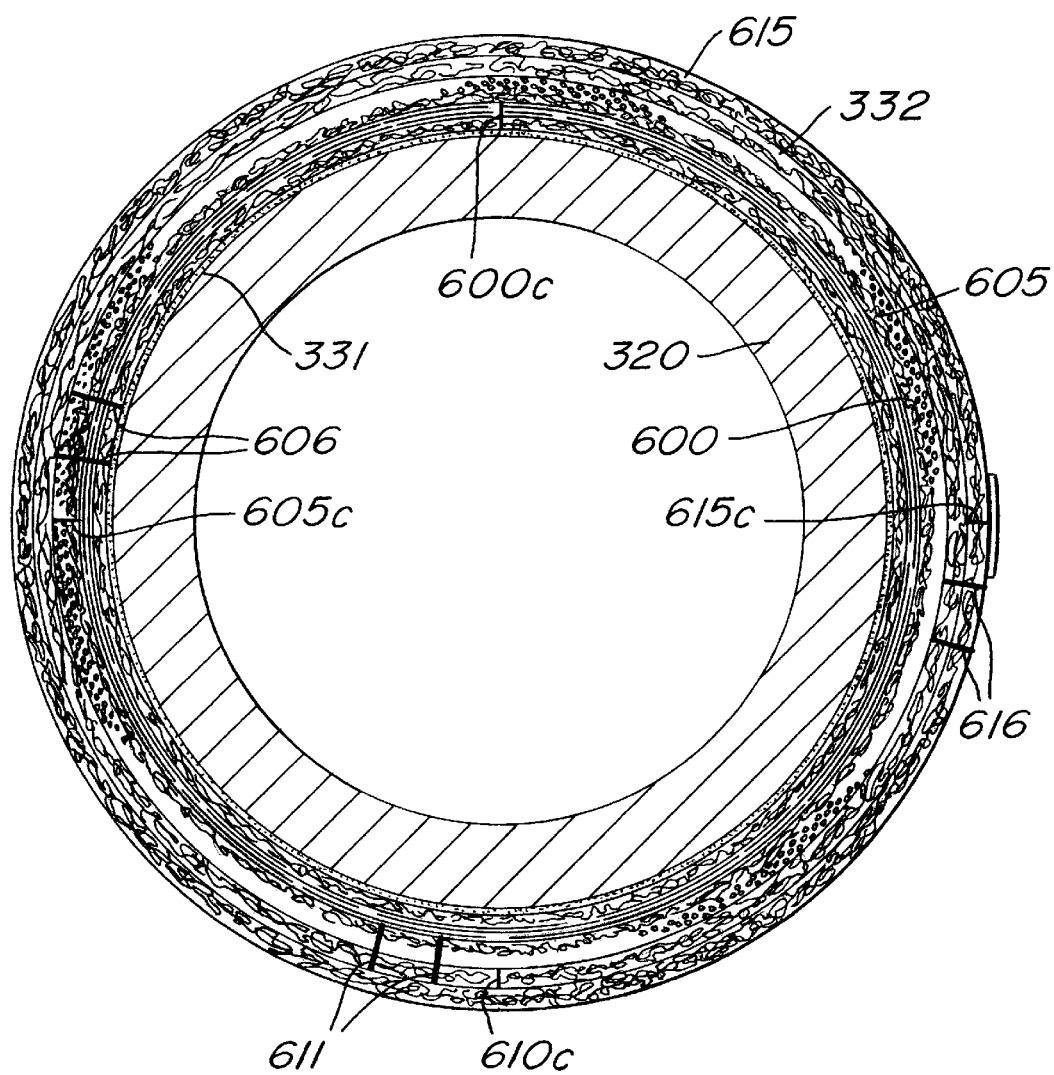
FIG. 22 is a cross-sectional view of a metal roll core with the dry glass fiber mat under layer wrapped thereover in accordance with the present invention.

Referring now to FIGS. 21 and 22, the length of the inside layer 600, measured from its leading edge 600a to its trailing edge 600b, is approximately equal to the circumference of the roll core outer surface 322 such that when the inner layer is applied thereon, its trailing edge 600b comes into abutting relation with its previously applied leading edge 600a. The abutment of edges 600a and 600b is shown in FIG. 22 at 600c. The second layer 605 is slightly greater in length than the inner layer 600 such that when the second layer is applied over the inner layer, its trailing edge 605b comes into abutting relation with its leading edge 605a. The abutment of the edges 605a and 605b is shown in FIG. 22 at 605c. Likewise, the third layer 610 is slightly greater in length than the second layer 605 such that when the third layer 610 is applied over the second layer 605, its trailing edge 610b comes into abutting relation with its leading edge 610a. The abutment of the edges 610a and 610b is shown in FIG. 22 at 610c. Likewise the abutment of the edges 615a and 615b of the outside layer 615 is shown in FIG. 22 at 615c. The leading and following edges 615a and 615b of the outside layer 615 are affixed to each other by any suitable means, e.g., stitching. By wrapping in this manner, the abutting seam of each layer 600c, 605c, 610c and 615c are spaced well away evenly from each other around the roll core outer surface 322 rather than being stacked atop top one. Stacking of the stitched seams on top of one another may result in an irregularity forming on the outer layer thickness of the finished roll core. The resulting reinforced fiber mat 332 is between 0.25 and 0.32 inches in thickness and preferably 0.30 inches in thickness. The number of layers of fabric and their structures and materials, as well as thickness can be engineered differently for different applications.

As shown in FIGS. 20 and 21, the layers 600 and 605 of the dry glass fiber mat are each formed of a two-ply construction. That is, the inner layer 600 is formed of a first ply 601 of densely packed glass fibers arranged in a random pattern and a second ply 602 of densely packed unidirectional glass fibers that are parallel to each other and oriented perpendicular to the central axis of the roll core 320. The second layer 605 is formed of a first ply 607 of densely packed glass fibers arranged in a random pattern and a second ply 608 of densely packed unidirectional glass fibers that are parallel to each other and oriented parallel to the central axis of the roll core 320. By including glass fibers that are linear and oriented in parallel and perpendicular directions with respect to the central axis of the roll core, the glass fiber mat 332 provides enhanced tensile strength in the direction of the roll core central axis and over the circumference of the roll core. The third layer 610 and outside layer 615 are both formed of a single ply of densely packed glass fibers arranged in a random pattern.

Figure 23:
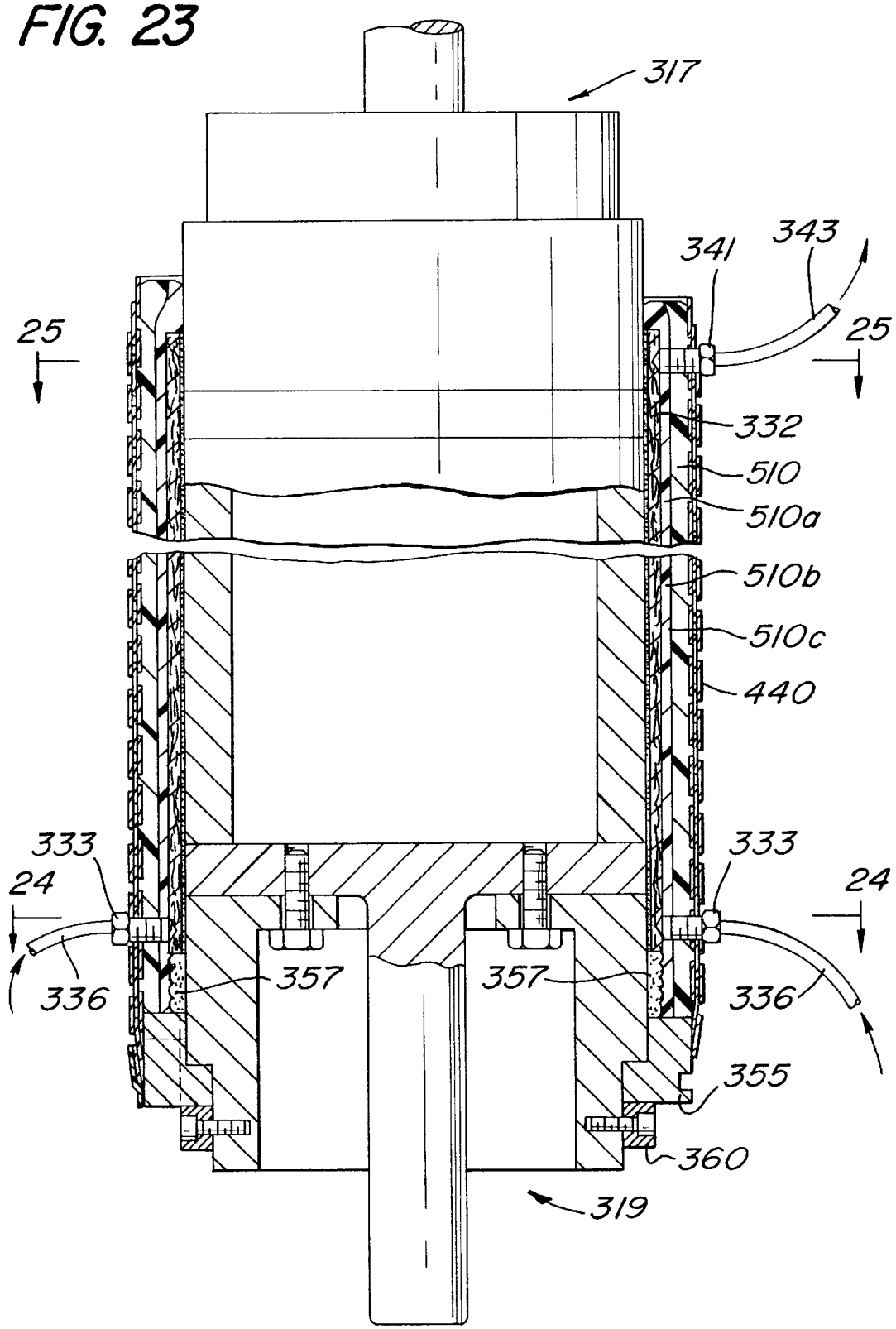
FIG. 23 is a partial sectional view of a roll core covered in accordance with the present invention which also demonstrates a method for infusing resin material into the dry reinforcement fiber mat under layer in accordance with the present invention.

Next, as best shown in FIG. 23, the spacer ring 355 is slidably mounted over the extension segment located at the roll core bottom end 319 utilizing the locking ring 360 in the manner previously described. A length of sealant 357 is applied to the extension segment 340 proximately the roll core lower end 319 between the lower edge of the glass fiber mat layer 332 and the spacer ring 355. The sealant 357 is provided to prevent the leakage of epoxy resin during the infusion process to be described below. The roll core 320 with the mat wrapped thereover is then located within the apparatus 10 and held vertically between the opposed chucks 230 and 325 in the elevated position in the manner previously described.

Next a "start-up process" is performed for two purposes: (1) to apply a predetermined amount of tension to the mold tape 440; and, (2) to stabilize the polymeric material being extruded from the feeding head 411 of the extruder assembly 410 to assure a proper rate of extrusion during rotation of the turntable 400. The start-up is performed prior to application of the polymeric material over the dry glass fiber mat layer 332. Generally speaking, during start-up, the turntable 400 and the extruder assembly 410 mounted thereto are rotated around the non-rotating roll core while the elevator is prevented from descending. Filament, extruded from the extruder head 411, drops through the opening 356 in the spacer ring 355 which is rotating with the turntable 400 and extruder assembly 410.

The start-up process is now described in more specific detail. The mold tape dispenser 430 is provided for dispensing a length of mold tape assembly 440 that is stored in spooled form thereon at a predetermined temperature and under tension. Referring now to FIG. 19, to perform the "start-up", a leading edge of the mold tape assembly 440 is unspooled from the mold tape dispenser 430 (FIG. 1) and is attached to the outer surface of the spacer ring 355 by any suitable means, e.g., high temperature adhesive tape 445. As best shown in FIG. 19, the leading edge of the mold tape assembly 440 is applied in a manner so that it extends over the opening 356 which forms as an integral part of the spacer ring 355. Rotation of the turntable 400 is started with the roll core 320 remaining non-rotational and in the elevated position. In other words, during the start-up, the elevator assembly 185 is not activated and therefore, the roll core remains in the elevated position rather than being lowered therefrom. During the start-up procedure, it is important that the mold tape 440 does not begin the helical winding process.

Figure 11:
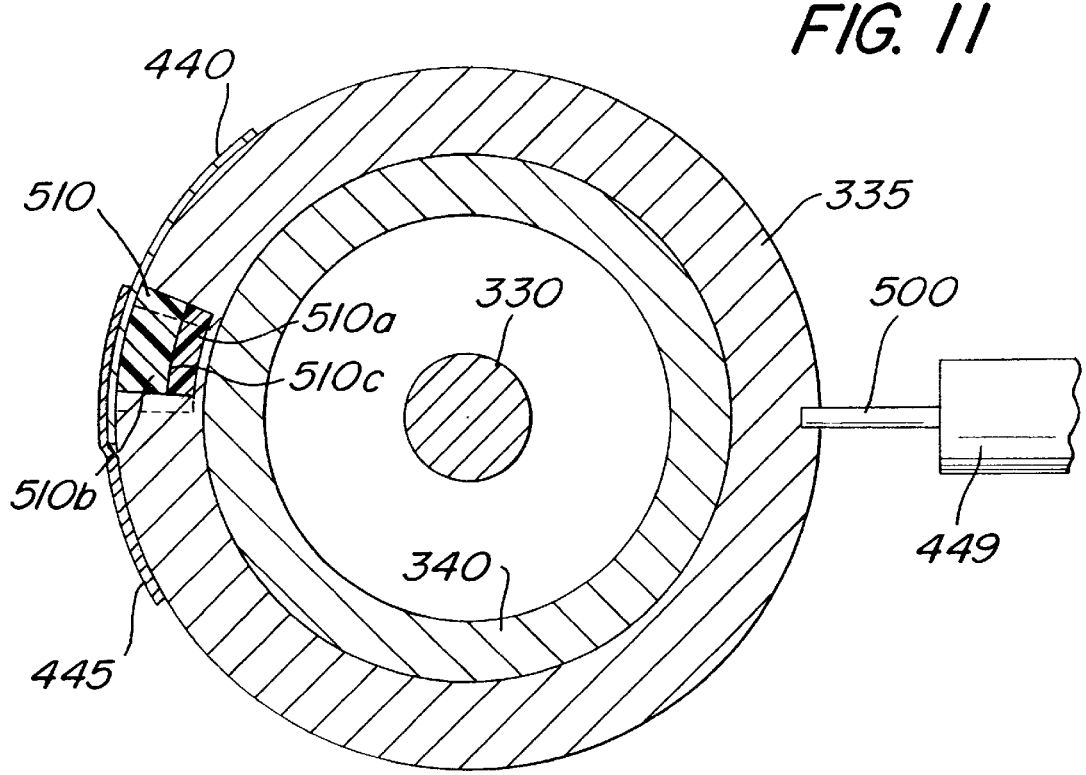
FIG. 11 is a sectional view taken along line 11—11 of FIG. 9.

Referring now to FIGS. 9 and 11, during the start-up, it is important that the mold tape assembly 440 does not wind onto itself. To prevent this from happening, the spacer ring 355, to which the leading edge of the mold tape assembly 440 is attached, must rotate with the turntable 400 while the roll core 320 remains non-rotational. To enable slidable rotation of the spacer ring 355 during the start-up, the spacer ring 355 is provided with a bore 495 in its sidewall that is aligned with and arranged to receive a pin 500 mounted on the turntable-mounted pin indexing device 449. During the start-up procedure, the pin indexing device 449 is arranged for indexing the pin 500 from a retracted position (best shown in FIG. 9) wherein the pin 500 is withdrawn from the bore 495, to an extended position (best shown in FIG. 11) wherein the pin 500 is inserted into the bore 495. The pin indexing device 449 is driven by compressed air delivered by an air compressor 447 (best shown in FIG. 2), also mounted on the turntable 400 and is activated in synchronization with the start of elevator movement. When the pin 500 is inserted within the bore 495 of the spacer ring 355 (FIG. 11), it causes the spacer ring 355 to slidably rotate with respect to the roll core outer surface 322 as the turntable 400 rotates. As previously stated, during the start-up procedure, the roll core 320 remains stationary. In this manner, during the start-up procedure, the mold tape assembly 440, with its leading edge attached to the spacer ring 355 is prevented from winding onto the spacer ring 355.

The opening 356 is best shown in FIGS. 11 and 19. With the mold tape assembly 440 extending over the opening 356 as shown therein, an enclosure is created having an open top and an open bottom and an outer side wall created by the mold tape assembly 440. In this regard, the feeding head 411 of the extruder assembly 410 is positioned directly over the open top of the opening 356. Because the pin 500 is inserted in the bore 496, during the start-up procedure, the opening 356 remains positioned directly under the extruder feeding head 411 as the turntable 400 rotates. In this manner, while the feeder head 411 is adjusted to attain the proper feed rate during rotation, the polymeric material 510 is extruded through the opening 356 rather than being allowed to pile up against the dry glass fiber mat layer 332. Once the predetermined mold tape tension has been reached and both the turntable 400 and the extrudate from feeder head 411 have reached stable rates, the start-up procedure is complete, and a polymeric layer may be built by winding over the dry glass fiber mat layer 332. The start-up procedure in the invention needs only two to four revolutions to accomplish.

Referring now to FIG. 2, to build the polymeric layer 510, the pin 500 is withdrawn from the spacer assembly bore 495 and the spacer ring 355 is locked down to the extension segment 340 by any suitable means, e.g., taping. The turntable 400 is activated. Since the spacer ring 355 is affixed to the extension segment, as the turntable 400 rotates, the mold tape assembly 440 unspools. Simultaneously, the motor driven elevator assembly 185 is activated which causes the roll core 320 to be slowly lowered from the elevated position downwardly. Downward movement of the roll core 320 may be at any suitable speed, e.g., 0.50 inches per revolution, and is determined by the dimension of the extrusion profile. Rotational movement of the turntable 400 causes the mold tape dispenser 430 to travel in a circular path around the roll core 320 and wind the mold tape assembly 440 around the spacer ring 355 on the roll core 320. As best seen in FIGS. 2 and 9, lowering of the roll core 320 by the elevator assembly 185 causes the mold tape assembly 440 to be wound helically in an overlapping manner over the length of the dry glass fiber mat layer 332 from the bottom 319 to the top 317 thereof. The amount of overlap, e.g., approximately 0.5 inches, is determined by the rate of downward movement of the roll core 320, e.g., 0.50 inches per rotation and the width of tape used, e.g., one inch. The resulting filament 510 is of sufficient thickness, e.g., approximately 0.65 inches, to enable the covered roll to machined down to a thickness desired by the customer, e.g., between 0.50 and 0.40 inches in thickness.

Figure 8:
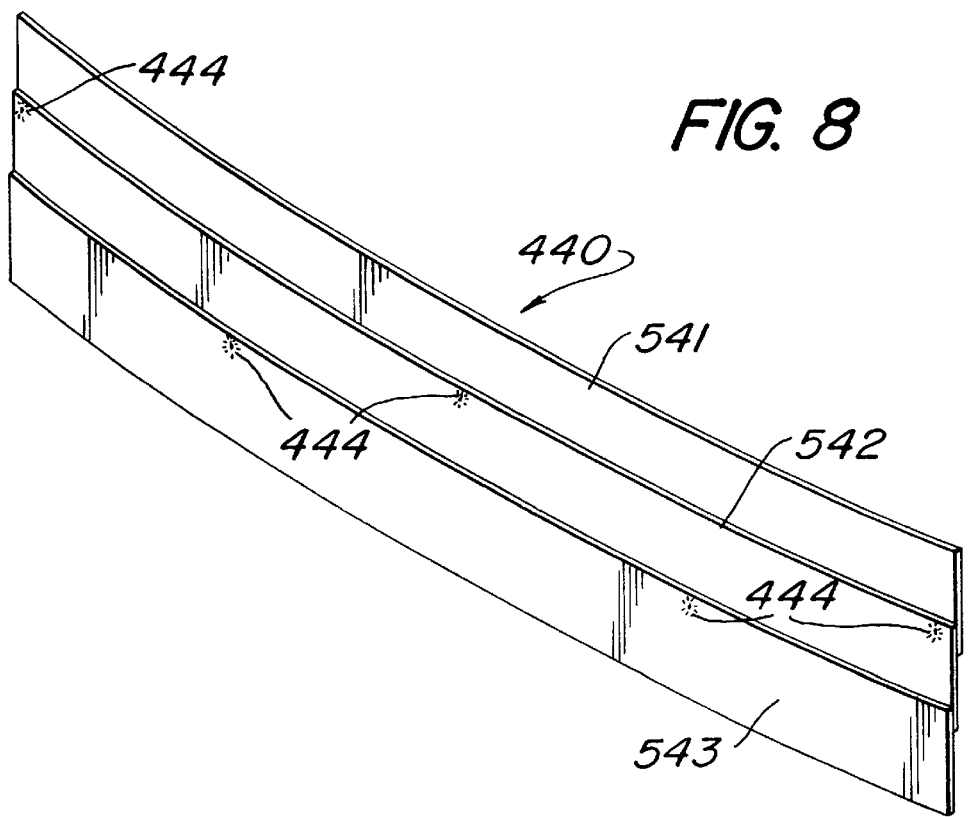
FIG. 8 is an isometric view of an improved mold tape which forms a portion of the apparatus of the present invention.
Figure 16:
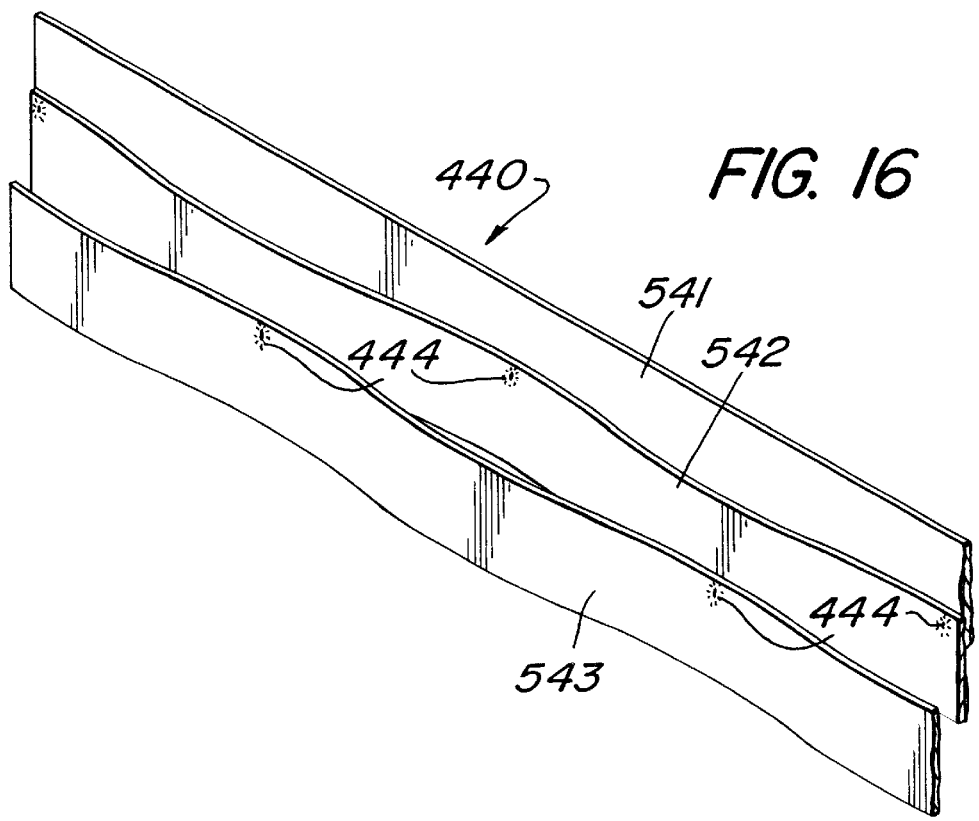
FIG. 16 is an isometric view of a three-tiered mold tape assembly fabricated in accordance with the present invention.

As best shown in FIGS. 8 and 16, the mold tape assembly 440 may be formed of any suitable material, e.g., stainless steel, and comprises a plurality of ribbons, i.e., an inner ribbon 541, an intermediate ribbon 542 and an outer ribbon 543. Each ribbon may be of any suitable height, e.g., 0.4 inches, and may be of any suitable thickness, e.g., 0.005 inches. The ribbons are affixed to one another in an overlapping manner by any suitable means, e.g., tack welds 444, to form a three-tiered construction. The zone of overlap between the inner ribbon 541 and the intermediate ribbon 542 and between the intermediate ribbon 542 and the outer ribbon 543 may be of any suitable amount, e.g., 0.1 inches. Significantly, the ribbons are tack welded to each other in a manner such that the resulting mold tape assembly 440 is arcuate in shape or curved at a predetermined radius of curvature over its length (best shown in FIG. 8) that is approximately equal to the circumference of the spacer ring 355, e.g., between 3.5 inches and 30 inches. In other words, as illustrated in FIG. 16, if the arcuate mold tape assembly 440 were straightened or flattened, the ribbon 542 between tack welds 444 would have a wavy appearance due to the fact that it was tack welded to ribbon 541 while maintained at a radius of curvature. Similarly, the ribbon 543 between tack welds 444 would have a wavy appearance due to the fact that it was tack welded to ribbon 542 while maintaining at a radius of curvature.

Figure 9A:
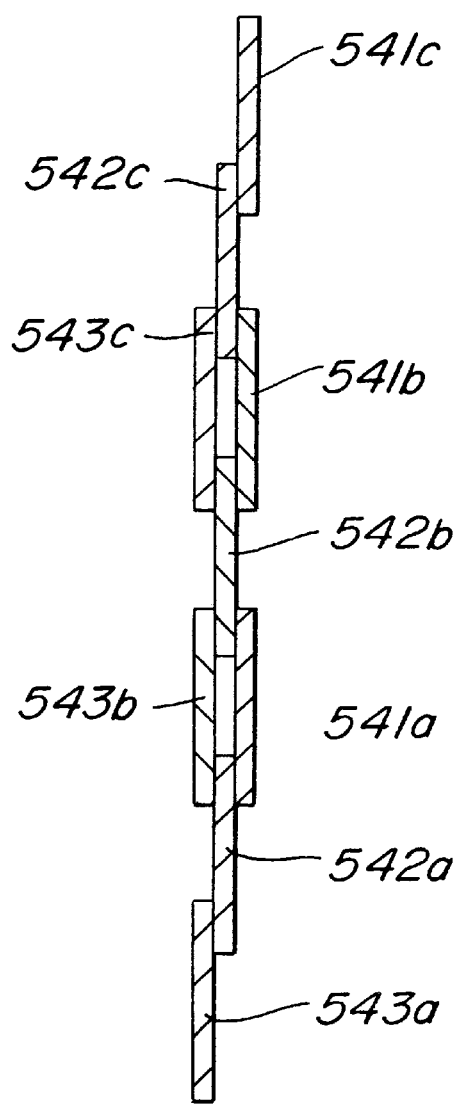
FIG. 9a is an enlarged view of three-tier mold tape assembly helically wound in accordance with the present invention.
Figure 9B:
FIG. 9b is an enlarged view of a two-tier mold tape assembly helically wound in accordance with the present invention.

Referring now to FIGS. 9 and 10, because the mold tape assembly 440 is fabricated as having a built-in arc or radius of curvature, as it is dispensed, it tends to wind onto itself to form a helix. Referring now to FIG. 9a, there is shown exemplary windings of a three-tiered mold tape assembly 440. The windings shown therein include a first winding comprising an inner ribbon 541a, an intermediate ribbon 542a and an outer ribbon 543a; a second winding comprising an inner ribbon 541b, an intermediate ribbon 542b and an outer ribbon 543b; and a third winding comprising an inner ribbon 541c, an intermediate ribbon 542c and an outer ribbon 543c. As shown in FIG. 9a, the outer ribbon of the second winding 543b touches and overlaps the intermediate ribbon of the first winding 542a. Likewise, the intermediate ribbon of the second winding 542b touches and overlaps the inner ribbon of the first winding 541a. In like manner, the outer and intermediate ribbons of the third winding, i.e., 543c and 542c, respectively, touch and overlap the intermediate and inner ribbons of the second winding, i.e., 542b and 541b, respectively. Also, as best shown in FIG. 9a, the amount of overlap from one winding to the next can be controlled by controlling the speed at which the roll core is lowered by the elevator assembly 185. Thus, as shown in FIGS. 9, 9a and 10, as the mold tape assembly 440 is wound, it results in a three-tiered cylindrical shape comprising the inner ribbon 541, the intermediate ribbon 542 and the outer ribbon 543. Referring now to FIG. 9b wherein the mold tape 440 is formed of a two-tier construction, when wound as described in connection with the three-tier construction, the two-tier construction also results in a cylindrical shape. The cylindrically shaped mold tape assembly 440 surrounds the fabric covered roll core in spaced-apart relationship therewith to form a weir or application zone 505 in which a filament 510 of polymeric material may be extruded (best shown in FIG. 9). The application zone 505 is defined by the space between the inside surface of the helically wound mold tape assembly 440 and the outside surface of the dry glass fiber layer 332.

While the mold tape 440 forms the application zone 505, the extruder assembly 410 extrudes the filament 510 of polymeric onto the glass fiber layer 332. As discussed above, the filament 510 may be formed of a dual layer construction comprising a high glass content under layer and a lower glass outer layer. The mold tape 440 acts as a supportive form to prevent sagging of the filament 510 prior to hardening. It also defines the outside diameter of the filament 510. Rotational movement of the turntable 400 causes the extruder assembly 410 to travel in a circular path around the fabric covered roll core 320. That, combined with the slow lowering of the fabric covered roll core 320 from the elevated position to the lowered position within the central opening 180 causes the continuously extruded filament 510 to be helically wound first onto the outer surface of the extension segment 340 located at the roll core bottom 319. The first winding of the filament 510 is supported by the spacer ring 355. Subsequent windings of the filament 510, are supported by the previous layer wound during the previous rotation. Subsequent windings of the filament 510 are wound onto the glass fiber mat layer 332 from bottom to top and, thereafter, onto the extension segments 340 located at the roll core top 317.

It is significant to mention that under this embodiment, since the filament 510 is extruded onto the glass fiber mat 332 rather than directly onto the roll core outer surface 322, which consists of exposed metal, no prior localized heating of the roll core outer surface is necessary. Thus, a glass fiber mat 332 having a very low thermal conductivity coefficient and a high temperature resistance capability prevents excessively rapid cooling and also prevents the build-up of residual stresses and cracking of the filament 510 during cooling.

The filament 510 may be extruded onto the dry glass fiber layer 332 at a predetermined thickness that is suitable to the customer, e.g., between 0.300 inch to 1.000 inch utilizing different sizes of feeding heads 411. As best shown in FIG. 3, in order to apply filament 510 to different sizes or roll core, the extruder assembly 410 and mold tape dispenser 430 are both mounted to a moveable platform 512 that is moveably secured within a plurality of elongated slots 514 located on the turntable 400. In this manner, the platform 512 may be moved along the elongated slots 514 to adjust the distance of the platform mounted devices from the roll core outer surface 322 thus enabling to position the filament 510 prior to application to the dry glass fiber layer 332.

As mentioned previously, during helical winding of the filament 510, the roll core 320 remains non-rotational while the extruder assembly 410 is rotated therearound along with the remaining turntable mounted devices. Application of the filament 510 is done in this manner rather than by rotating the roll core 320 and keeping the extruder assembly 410 and other turntable mounted devices stationary. Application in this manner would result in the undesirable build-up of centrifugal forces that would tend to propel the extruded filament 510 away from the roll core outer surface 322 during helical winding thereby impairing the bonding of the extruded filament 510 to the dry glass fiber layer 332.

This centrifugal force becomes detrimental when covering very large sized roll cores with relatively low viscosity or slow set-up resin materials at high production rates, i.e. high rotational speed. In the present invention, application of the continuous filament 510 onto the roll core 320 in a vertical orientation also utilizes gravitational force to pack down the filament 510 onto the supporting layer. Under the prior art methods, a cover is wound by rotating a roll core while orientated horizontally where the gravitational forces tend to push the cover against the roll core when it is at the top of its rotation and to pull the cover away from the roll core when it is at the bottom of its rotation. A higher rotation rate could be applied to even out this problem but it would result in the build-up of centrifugal force that tends to propel the deposited filament 510 away from the roll core outer surface 322. Also, under the prior art where the roll core is oriented horizontally during winding of the cover, only a fast-set thermoset resin (either by its own exotherm or by externally applied heat) is suitable for use and the resulting cover may not be suitable for demanding applications such as supercalendering.

Figure 24:
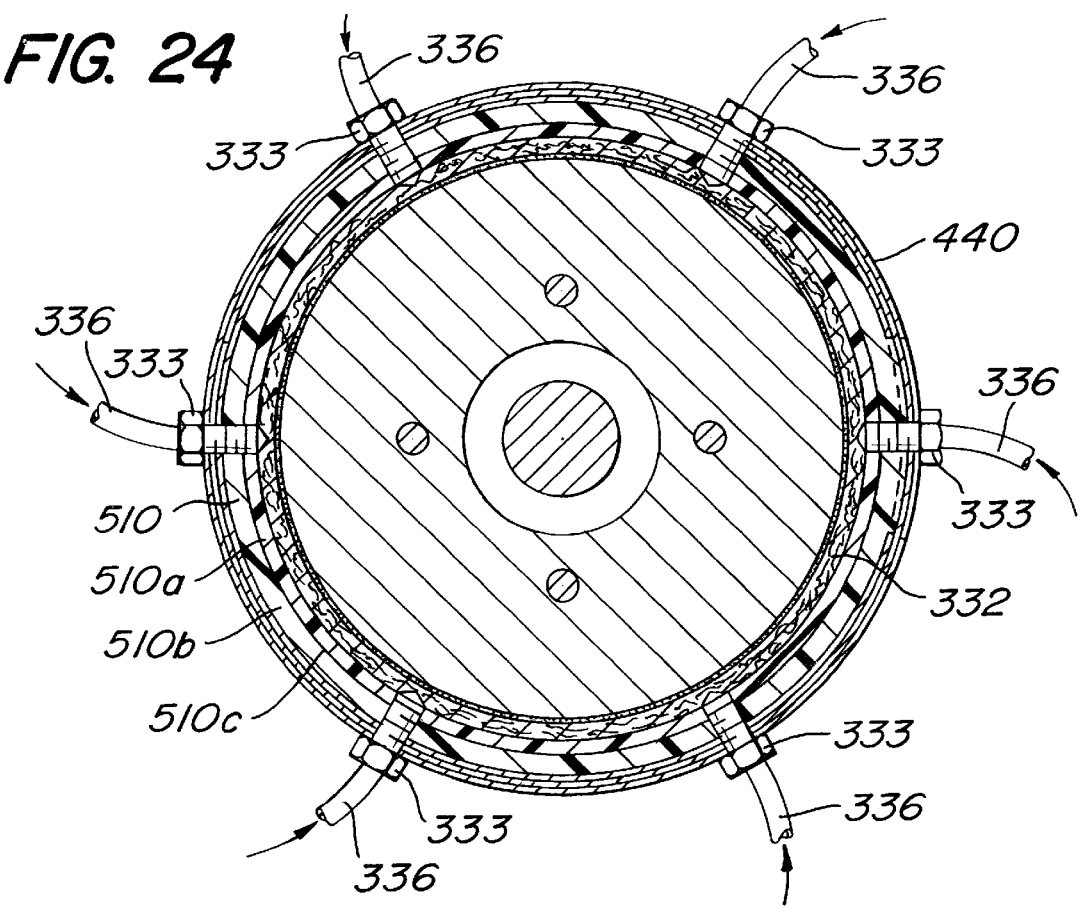
FIG. 24 is a sectional view taken along line 24—24 of FIG. 23.
Figure 25:
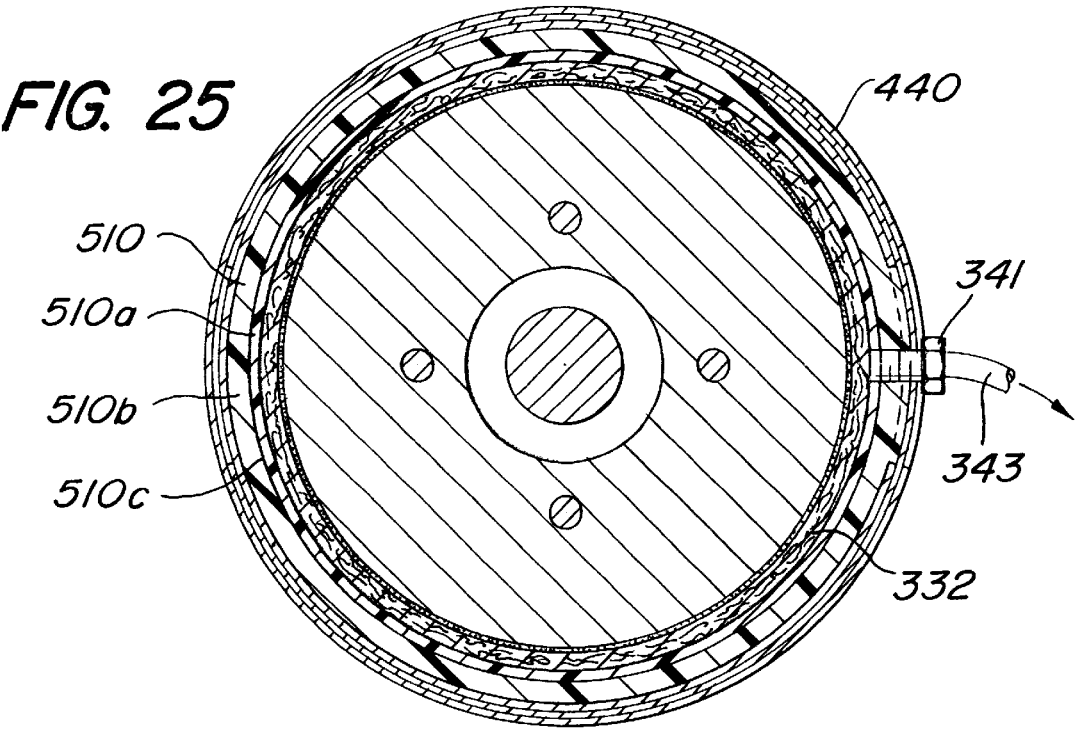
FIG. 25 is a sectional view taken along line 25—25 of FIG. 23.

Next, the covered roll core is allowed to cool while housed within the central opening 180. Alternatively, the covered roll core may be removed from the apparatus 10 and placed in an oven or other thermally insulated chamber to control the rate of cooling of the covered roll core. Once cooling is complete, the roll core is prepared for the infusion of epoxy resin into the densely wrapped glass fiber mat layer 332 by drilling holes through the mold tape 440 and the polymeric layer 510 into the interior of the glass fiber mat layer 332. As best shown in FIGS. 23 through 25, a plurality of entrance holes are drilled proximate the roll core bottom 319 (best shown in FIGS. 23 and 24) at the locations shown therein and valves 333 are inserted therethrough. The valves 333 are each connected to lines 336 through which the epoxy resin is fed (or supplied). A similar valve 341 is inserted through a vacuum hole drilled proximate the roll core top 317. The vacuum valve 341 is connected to a vacuum source by a vacuum line 343 and a vacuum is pulled. The epoxy resin is fed (or supplied) through the entrance valves 333 and infuses through the glass fiber layer 332. The previously applied sealant 357 prevents the epoxy resin from leaking downwardly over the extension segment 340 located proximate the bottom end of the roll core 319. Maintaining the level of the vacuum valve 341 above that of the entrance valves 333 assures that air bubbles within the glass fiber mat 332 will escape through the vacuum valve 341 during epoxy resin infusion. Eventually, the epoxy resin seeps out of the vacuum valve 341. When this occurs, all valves 333 and 341 are closed. The epoxy resin is then allowed to gel.

Figure 26:
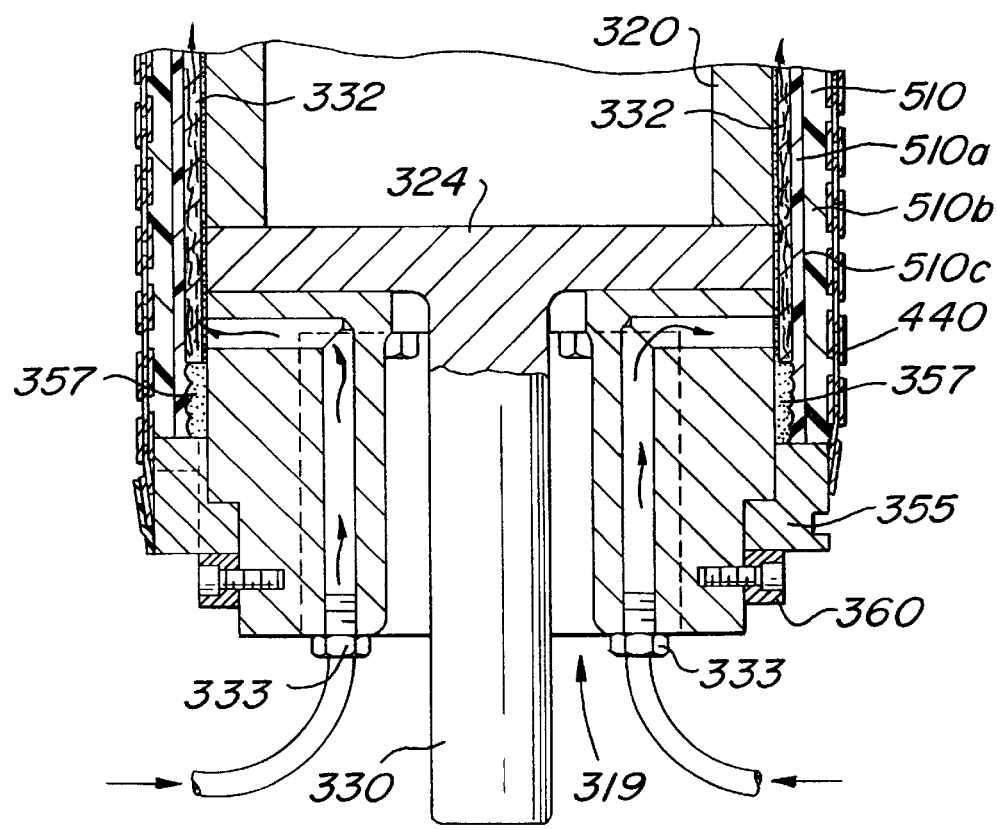
FIG. 26 is a sectional view of the bottom portion of the covered roll demonstrating an alternative method for infusing resin material in accordance with the present invention.

FIG. 26 illustrates an alternative method for inserting for preparing the roll core for the infusion of epoxy resin into the glass fiber mat layer 332. Under this method, passage holes are drilled through the extension segment 340 located proximate the roll core bottom 319 and into the interior of the glass fiber mat layer 332 just above the location of the sealant 357 and valves 333 are inserted therethrough.

Figure 27:
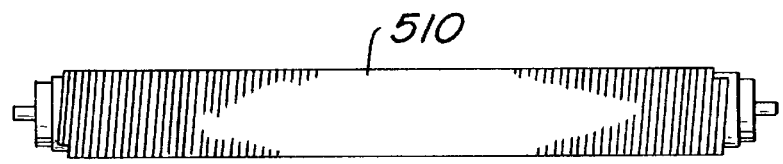
FIG. 27 is a side view of a metal roll core covered in accordance with the method of the present invention.
Figure 28:
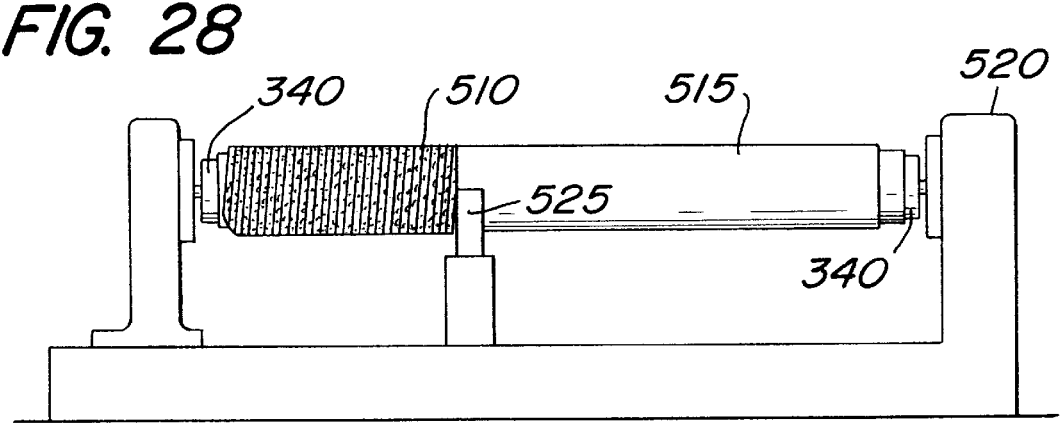
FIG. 28 is a side view of a metal roll core covered in accordance with the present invention shown held at its ends within a lathe; and, FIG. 29 is an isometric view of a finished roll core that has been covered in accordance with the present invention.

Thereafter, the covered roll core with mold tape 440 wrapped thereon may be removed from the apparatus 10 and place horizontally in an oven for curing of the epoxy resin while being rotated. Next, the mold tape 440 may be removed from the outer surface of the polymeric material 510 by unwrapping it. As best shown in FIG. 27, the layer of polymeric material 510 has a roughened surface that must be machined to a desired smoothness. This may be accomplished by placing the covered roll core horizontally on a lathe 520 and machining the outer surface of the polymeric layer 510 to a predetermined smoothness 515 utilizing a suitable cutting tool 525 as shown in FIG. 28.

Figure 29:
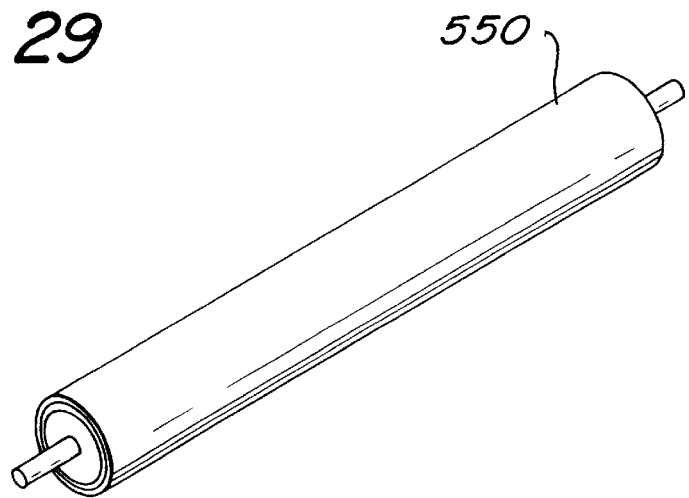

The next part of the process to cut through the layer of polymeric material 510 down to the roll core outer surface 322 and remove the two extension segments 340 at the ends thereof. The edges may be treated to form a slight bevel (not shown), which is currently known in the art, to obtain a finished roll that may be returned to the customer. The finished covered roll is shown at 550 in FIG. 29 with the extension segments 340 and spacer assembly 350 removed. A typical covered roll with a dimension of 20 inches in diameter and 150 inches in length fabricated under the method and apparatus of the present invention possesses a combination of improved performance characteristics including: a surface roughness of between 0~2 Ra micro inch attainable, a Young's modulus between 650,000 and 1,000,000 psi, a cover hardness between 87 to 93 Shore D, and a glass transition temperature, $T_g$, of approximately 430° Fahrenheit.

Figure 12:
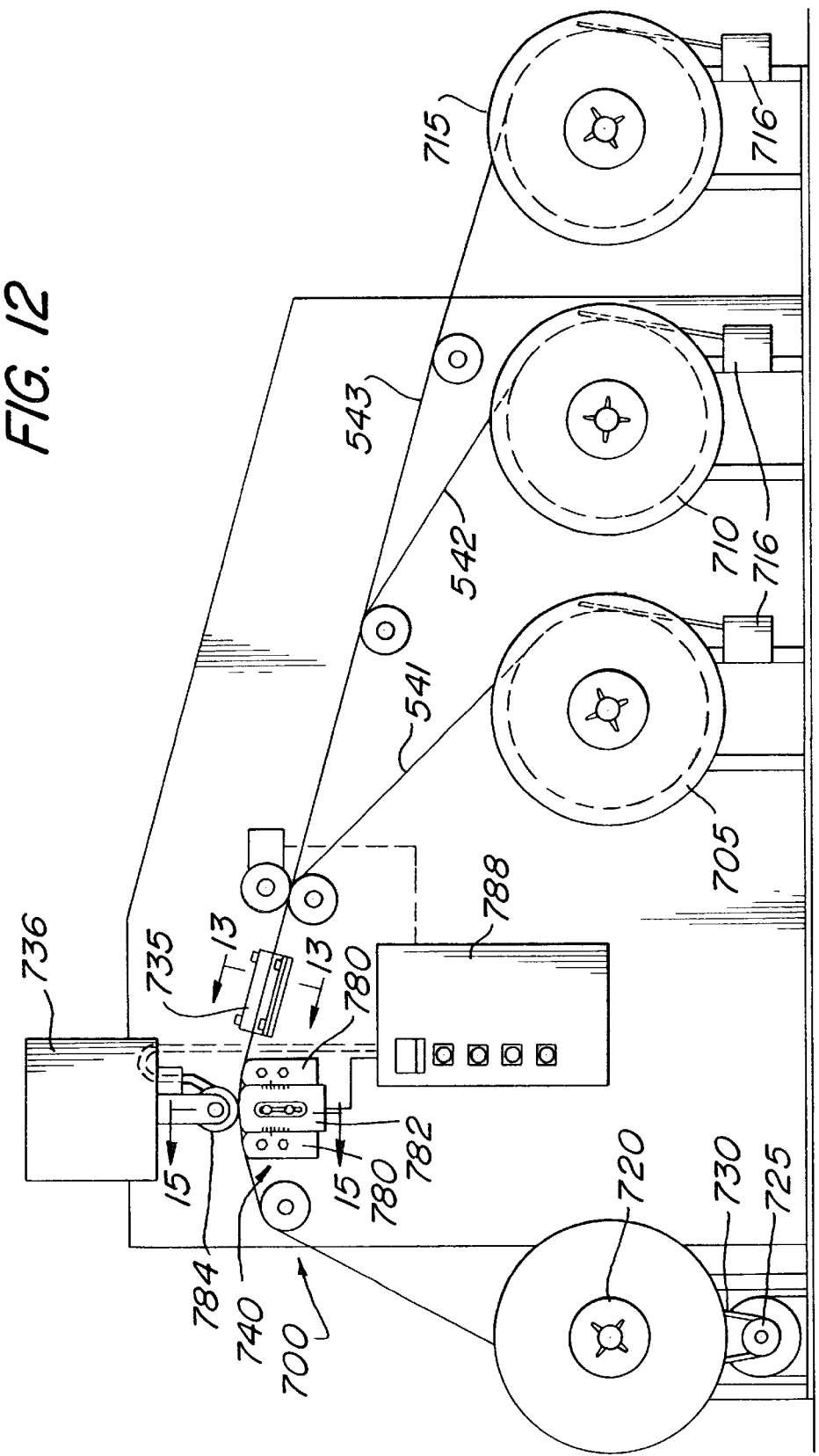
FIG. 12 is a side view of a mold tape fabricating apparatus forming a portion of the present invention.

Referring now to FIG. 12, there is shown therein an apparatus 700 for fabricating the multi-tiered mold tape assembly 440 of the present invention. As shown therein, the apparatus 700 comprises a plurality of dispensing spools 705, 710 and 715 each having a single ribbon wound thereon. In particular, the dispensing spool 705 has the inner ribbon 541 wound thereon; the dispensing spool 710 has the intermediate ribbon 542 wound thereon and the dispensing spool 715 has the outer ribbon 543 wound thereon. A take-up wheel 720, linked to a motor-driven drive pulley 725 by means of a drive belt 730, draws the single ribbons 541, 542 and 543 simultaneously from their respective dispensing spools 705, 710 and 715 and conveys them at a continuous rate of speed through an alignment assembly 735 and thereafter onto the surface of a curvature shoe 740. The curvature shoe 740 maintains the ribbons in an arcuate position while a welding device 736 positioned thereover tack welds the ribbons together intermittently as they pass thereunder resulting in a mold tape assembly 440 having a predetermined radius of curvature. Each of the dispensing spools 705, 710 and 715 is provided with a brake assembly 716 to enable tension adjustment of the ribbons during the fabrication of the mold tape assembly 440. The resulting mold tape assembly 440 is wound onto the take-up wheel 720. The take-up wheel 720 with the finished mold tape assembly 440 spooled thereon may be removed from the apparatus 700 and mounted onto the turntable mounted mold tape dispenser 430.

Figure 13:
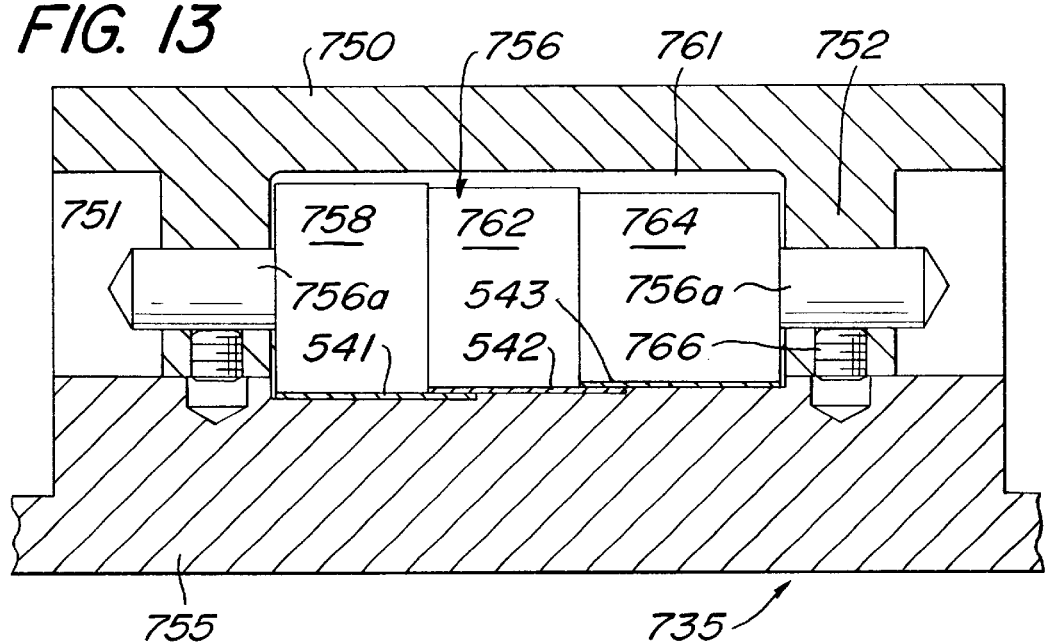
FIG. 13 is an enlarged sectional view taken along line 13—13 of FIG. 12.
Figure 14:
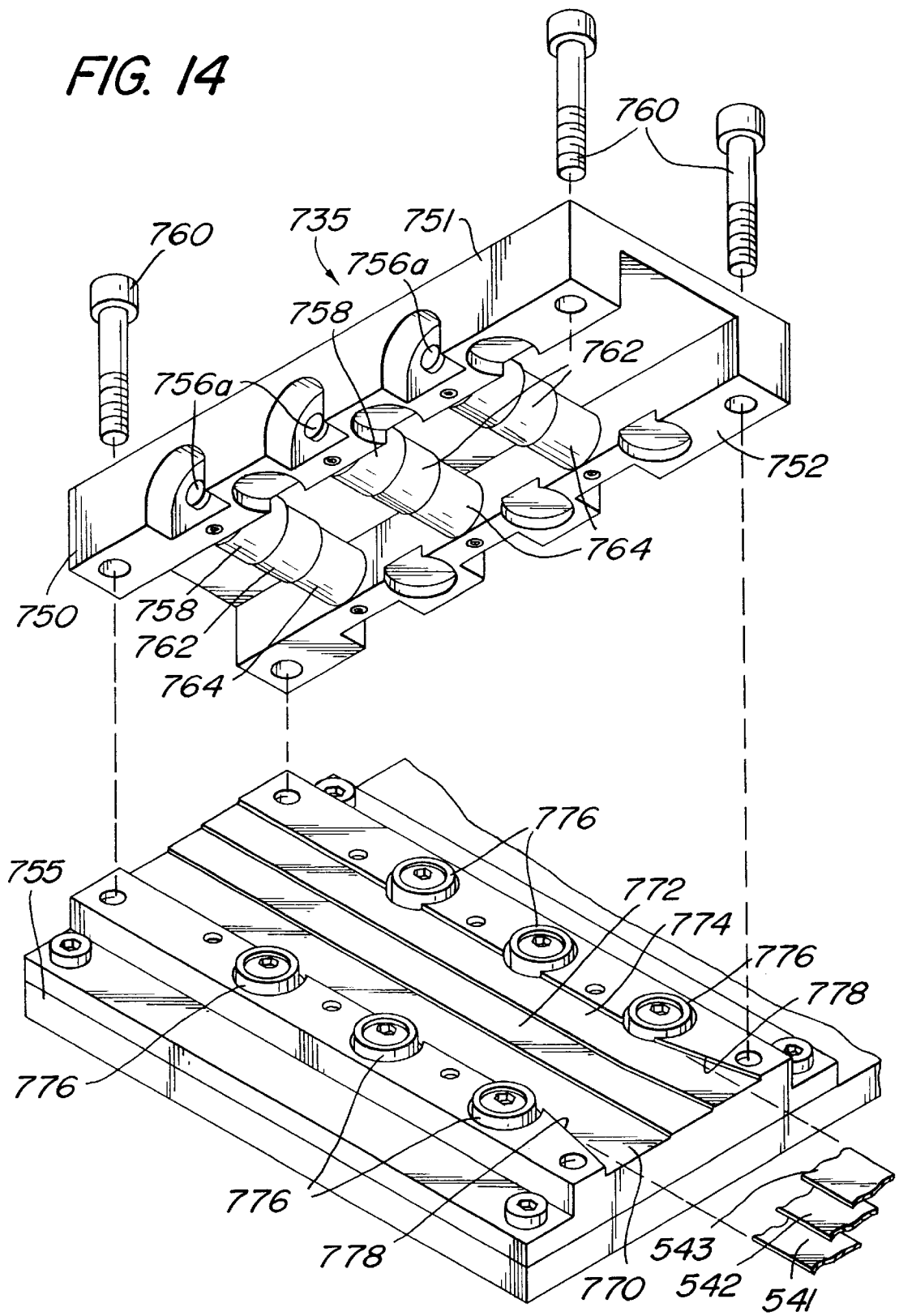
FIG. 14 is an isometric view of a two-part alignment jig which is a component of the mold tape fabricating apparatus of the present invention shown in FIG. 12.

Referring now to FIGS. 13 and 14, the alignment assembly 735 is provided for simultaneously receiving the single ribbons 541, 542 and 543 from each of the dispensing spools 705, 710 and 715 and aligning the single ribbons with respect to each other in a substantially parallel and partially overlapping orientation as they are passed therethrough to form the mold tape assembly 440 of the present invention as shown in FIG. 8. The alignment assembly 735 comprises an upper portion 750 and a lower portion 755 that may be secured together by any suitable means, e.g., a plurality of bolts 760, to form an enclosed channel 761 as best seen in FIG. 13. The lower portion 755 of the alignment assembly 735 includes a groove 770, a first ledge 772 located above the groove 770 and a second ledge 774 located above the first ledge 772 that together form a floor of the enclosed channel 761. The groove 770 is sized to accommodate the entire width and thickness of the inner ribbon 541 as the ribbon passes through the enclosed channel 761. The first ledge 772 is sized to accommodate only a portion of the width of the intermediate ribbon 542, the remaining width of the intermediate ribbon 542 partially overlying the inner ribbon 541 as it passes through the enclosed channel 761. The second ledge 774 is sized to accommodate only a portion of the width of the outer ribbon 543, the remaining width of the outer ribbon 543 partially overlying the intermediate ribbon 542 as it passes through the enclosed channel 761.

The upper portion 750 additionally comprises a pair of opposed walls 751 and 752 that extend downwardly. The wall 751 includes a plurality of, e.g., three, through openings that are aligned with a plurality of, e.g., three, through openings located on the opposing wall 752. The through openings enable the mounting of a plurality of rollers between the walls and within the enclosed channel 761 in a parallel relationship. Each roller includes a central axle 756a and has disposed on it a first shoulder 758, a second shoulder 762 and a third shoulder 764, the first shoulder 758 being slightly larger in diameter than the second shoulder 762, and the second shoulder 762 being slightly larger in diameter than the third shoulder 764. The first shoulder 758 is disposed within the channel 761 in a spaced-apart relationship with the groove 770 to allow only the passage of the inner ribbon 541 therebetween. The second shoulder 762 is disposed within the channel 761 in a spaced-apart relationship with the first ledge 772 to allow only the passage of the intermediate ribbon 542 therebetween. Likewise, the third shoulder 764 is disposed within the channel 761 in a spaced-apart relationship with the second ledge 774 to allow only the passage of the outer ribbon 543 therebetween. In this manner, the alignment assembly 735 assures proper alignment of the ribbons 541, 542 and 543 in a substantially parallel and overlapping orientation during welding to form the mold tape assembly 440. The lower portion 755 is also provided with a plurality of guide rollers 776 to facilitate passage of the ribbons through the enclosed channel 761. Additionally, a V-shaped entrance 778 is provided on the lower portion 755 for receiving the single ribbons 541, 542 and 543 and guiding them through the alignment assembly 735.

Figure 15:
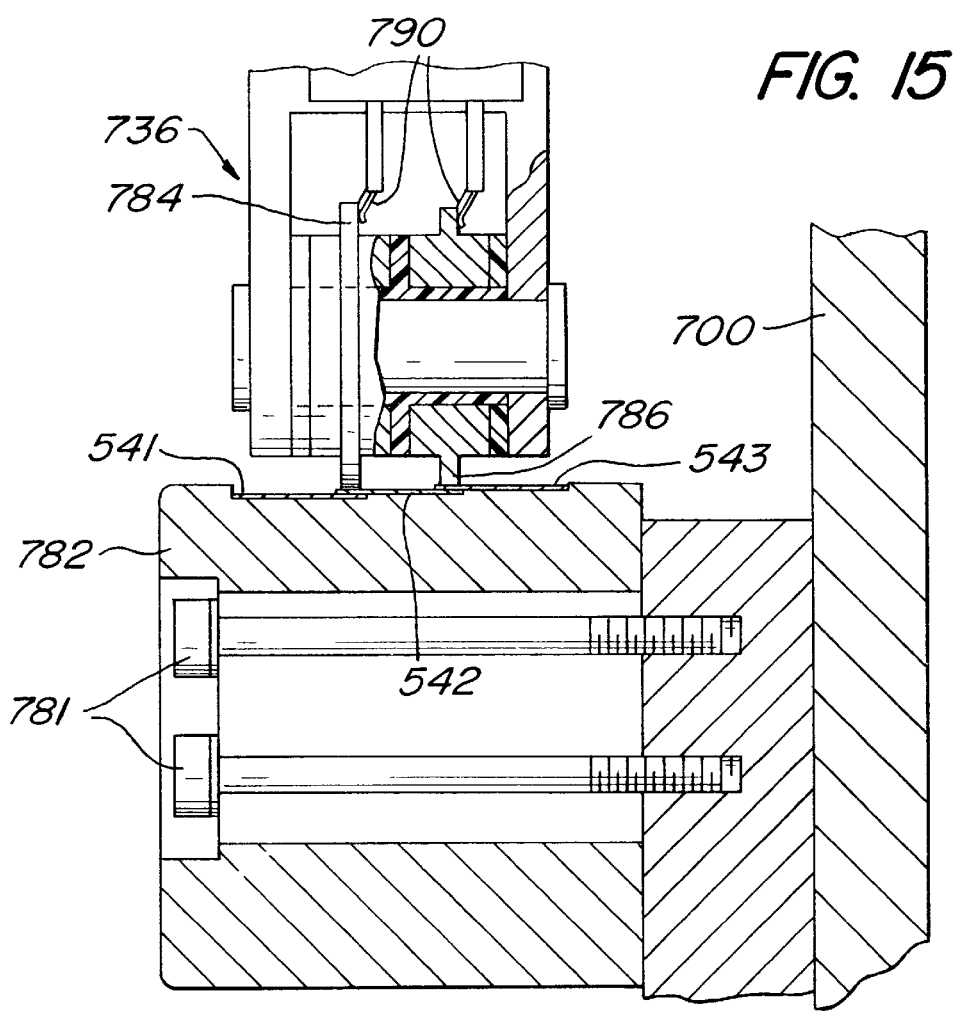
FIG. 15 is an enlarged sectional view taken along line 15—15 of FIG. 12.
Figure 17:
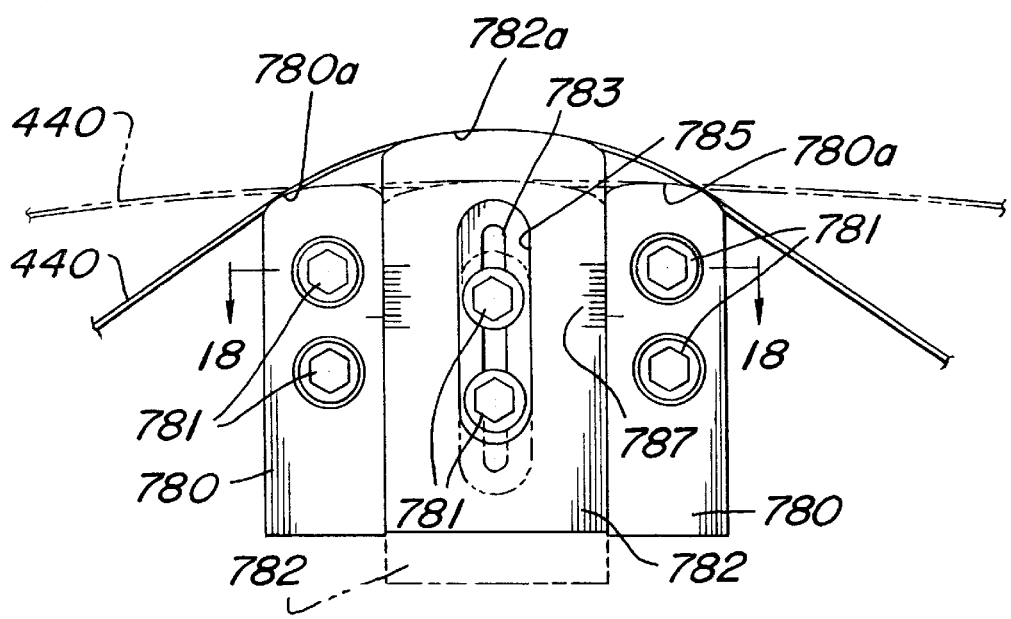
FIG. 17 is a side view of the fixed and adjustable portions of a spot welding shoe which is a component of the mold tape fabricating apparatus of the present invention shown in FIG. 12.
Figure 18:
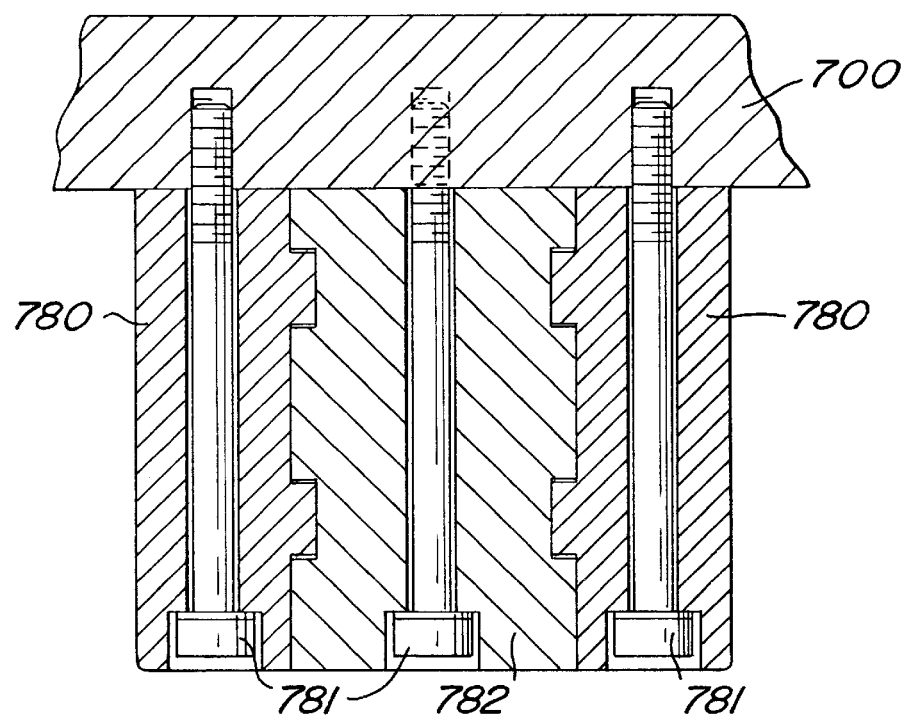
FIG. 18 is an enlarged sectional view taken along line 18—18 of FIG. 17.

The details of the curvature shoe 740 are set forth in FIGS. 15, 17 and 18. As previously mentioned, the curvature shoe 740 is provided for receiving the single ribbons 541, 542 and 543 and supporting them at a predetermined radius of curvature while they are conveyed thereover and tack welded together by the welding device 736. The curvature shoe 740 basically comprises a pair of fixed elements 780 and an adjustable element 782. As best shown in FIG. 17, the fixed elements 780 are spaced apart from each other by a predetermined distance. Each fixed element 780 includes a top surface 780a that is provided for supporting the plurality of aligned ribbons 440 while they are conveyed thereover. Each top surface 780a is rounded. As best shown in FIG. 18, the fixed elements 780 are affixed to the apparatus 700 by any suitable means, e.g., by bolts 781. Referring again to FIG. 17, the adjustable element 782 is disposed between the fixed elements 780 and includes a rounded top surface 782a that is also arranged for supporting the plurality of aligned single ribbons 440 for conveyance thereover during welding. As best shown in FIG. 18, the adjustable element 782 is affixed to the apparatus by any suitable means, e.g., by bolts 781. As best shown in FIG. 17, the adjustable element 782 includes a vertically oriented slot 783 that is located within a recess 785. The bolts 781 are disposed within the recess 785 and through the slot 783 in a manner that enables vertical movement of the adjustable element 782 from a lowered position (shown by phantom lines in FIG. 17) through a number of adjusted positions to an elevated position (shown in solid lines in FIG. 17). In the lowered position, the aligned ribbons 440 (shown by phantom lines in FIG. 17) extend across the top surfaces of the fixed and adjustable heads 780a and 782a and are maintained thereon at a maximal radius of curvature. Additionally, indicia 787 are provided on the fixed and adjustable elements 780 and 782 to enable a user to accurately obtain a desired radius of curvature of the mold tape 440. By tack welding the ribbons together while disposed over the curvature shoe, the ribbons are affixed together at a desired radius of curvature to form the mold tape assembly 440 of the present invention. In the elevated position, the aligned ribbons 440 (shown in solid lines in FIG. 17) extend across the top surfaces of the fixed and adjustable heads 780a and 782a and are maintained thereon at a tight radius of curvature. Upon tack welding the ribbons together, the resulting mold tape assembly 440 will maintain this radius of curvature.

The welding device 736 is best shown in FIG. 15 and is provided for tack welding the ribbons 541, 542 and 543 together in their overlapping orientation and at the predetermined radius of curvature determined by adjustment of the curvature shoe 740 to make possible the helical winding of the mold tape 440 around the fabric wrapped roll core during the application of the polymeric material 510 as discussed above. The welding device 736 includes a pair of circular welding heads 784 and 786 that are in electrical contact with a voltage/current source 788 (FIG. 12) through electrical contact brushes 790. The welding head 784 contacts the intermediate ribbon 542 in the area it lies over the inner ribbon 541. Likewise, the welding head 786 contacts the outer ribbon 543 in the area it lies over the intermediate ribbon 542. As the ribbons 541, 542 and 543 are conveyed over the curvature shoe, the welding heads 784 and 786 rotate while remaining in contact therewith. A periodic voltage/current is provided from the voltage/current source 788 through the welding head 784 which causes the ribbons 542 and 541 to become affixed to each other by a plurality of tack welds 444 (best shown in FIG. 8). Similarly, a periodic voltage/current is provided through welding head 786 which causes the ribbons 543 and 542 to become affixed to each other by a plurality of tack welds 444 (also best shown in FIG. 8). Alternatively, the adjustable element 782a of the curvature shoe 740 in the present invention can be replaced by using a roller of which its face is machined accordingly to support the plurality of aligned single ribbons 440 for conveyance thereover during welding.

I claim:

1. A covered roll for use in calendaring web sheets, said covered roll comprising:
   a. a metal roll core base substantially cylindrical in shape and arranged for rotation during use; and,
   b. a cover formed of a thermoplastic material circumferentially surrounding said roll core base, said cover being bound to said rotatable roll core base.

2. The covered roll of claim 1 wherein said thermoplastic material is formed of polyetherimide.

3. The covered roll of claim 1 wherein said thermoplastic material is formed of polyethersulfone.

4. The covered roll of claim 1 wherein said thermoplastic material is formed of polyphenylene sulfide.

5. The covered roll of claim 1 wherein said thermoplastic material is formed of polyetheretherketone.

6. The covered roll of claim 1 wherein said thermoplastic material is formed of polyphenylene oxide.

7. The covered roll of claim 1 wherein said thermoplastic material includes a concentration of glass fibers.

8. The covered roll of claim 1 wherein said thermoplastic material includes a concentration of carbon fibers.

9. The covered roll of claim 1 wherein said thermoplastic material includes a concentration of aramid fibers.

10. The covered roll of claim 1 wherein said thermoplastic material comprises a dual layer construction comprising an understock and a top stock, said top stock comprising a glass fiber concentration between 0% and 40% by weight glass fiber.

11. The covered roll of claim 1 wherein said thermoplastic material comprises a dual layer construction comprising an understock and a top stock, said top stock comprising an aramid fiber concentration between 0% and 30% by weight aramid fiber.

12. The covered roll of claim 1 wherein said thermoplastic material comprises a dual layer construction comprising an understock and a top stock, said top stock comprising a carbon fiber concentration between 0% and 35% by weight carbon fiber.

13. The covered roll of claim 1 wherein said thermoplastic material comprises a dual layer construction comprising an top stock formed of a thermoplastic material having a predetermined fiber concentration and an understock formed of a thermoplastic material having a predetermined fiber concentration, and wherein the fiber concentration of said top stock is approximately equal to the fiber concentration of said understock.

14. The covered roll of claim 1, wherein said roll core base comprises an outer surface, said thermoplastic cover additionally comprising a thermoset resin infused reinforcement fiber mat layer circumferentially surrounding the outer surface of said roll core base and bound thereto by an adhesive layer disposed between the outer surface of said roll core base and said fiber mat layer.

15. The covered roll of claim 14 wherein said reinforcement fiber mat layer comprises glass fibers.

16. The covered roll of claim 14 wherein said reinforcement fiber mat layer comprises carbon fibers.

17. The covered roll of claim 14 wherein said reinforcement fiber mat layer comprises aramid fibers.

* * * * *